(12) United States Patent  
Gallant et al.

(10) Patent No.: US 8,780,919 B2  
(45) Date of Patent: Jul. 15, 2014

(54) INTELLIGENT POLICY SERVER SYSTEM AND METHOD FOR BANDWIDTH CONTROL IN AN ATM NETWORK

(71) Applicant: Verizon Business Global LLC, Basking Ridge, NJ (US)

(72) Inventors: John K. Gallant, Plano, TX (US); Thomas Glenn Hall, Jr., Richardson, TX (US); Steven R. Donovan, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/936,908

(22) Filed: Jul. 8, 2013

(65) Prior Publication Data

US 2014/0016646 A1  Jan. 16, 2014

Related U.S. Application Data

(62) Division of application No. 09/766,943, filed on Jan. 22, 2001, now Pat. No. 8,483,225.

(60) Provisional application No. 60/176,928, filed on Jan. 20, 2000.

(51) Int. Cl.
*H04L 12/28* (2006.01)
*H04L 12/54* (2013.01)

(52) U.S. Cl.
CPC .................................. *H04L 12/5601* (2013.01)
USPC ....................................................... 370/395.1

(58) Field of Classification Search
CPC .................................................. H04L 12/5601
USPC ....................................................... 370/395.1
See application file for complete search history.

(56) References Cited

U.S. PATENT DOCUMENTS

| | | | |
|---|---|---|---|
| 5,276,676 A | 1/1994 | Horn et al. | |
| 5,473,679 A | 12/1995 | La Porta et al. | |
| 5,485,578 A | 1/1996 | Sweazey | |
| 5,539,884 A | 7/1996 | Robrock, II | |
| 5,568,475 A | 10/1996 | Doshi et al. | |
| 5,583,864 A * | 12/1996 | Lightfoot et al. | 370/396 |
| 5,649,108 A | 7/1997 | Spiegel et al. | |
| 5,761,191 A | 6/1998 | VanDervort et al. | |
| 5,819,019 A | 10/1998 | Nelson | |
| 5,825,780 A | 10/1998 | Christie | |
| 5,889,782 A | 3/1999 | Dendi | |
| 5,892,764 A | 4/1999 | Riemann et al. | |
| 5,896,371 A | 4/1999 | Kobayashi et al. | |
| 5,946,323 A | 8/1999 | Eakins et al. | |
| 5,987,520 A | 11/1999 | Libby et al. | |
| 5,991,892 A | 11/1999 | Honda | |

(Continued)

OTHER PUBLICATIONS

"Voice and Telephony Over ATM—ATM Trunking Using AAL1 for Narrowband Services Version 1.0," The ATM Forum Technical Committee, AF-VTOA-0089.000, 38 pages, Jul. 1997.

*Primary Examiner* — Mark Rinehart
*Assistant Examiner* — Christopher R Crompton

(57) ABSTRACT

An intelligent policy server system and method for providing multiple service features and for controlling bandwidth usage in an ATM network. Profile arrays are provided which define feature authorizations and provisioning for subscribers and Customer Logical Ports served by edge switches. Depending on triggers associated with a signaling message received in an edge switch, a particular feature is invoked and executed by a policy server.

20 Claims, 19 Drawing Sheets

(56) References Cited

U.S. PATENT DOCUMENTS

| | | |
|---|---|---|
| 5,996,001 A | 11/1999 | Quarles et al. |
| 6,009,099 A | 12/1999 | Lewis et al. |
| 6,023,474 A | 2/2000 | Gardner et al. |
| 6,026,091 A | 2/2000 | Christie et al. |
| 6,041,039 A | 3/2000 | Kilkki et al. |
| 6,078,586 A | 6/2000 | Dugan et al. |
| 6,081,524 A | 6/2000 | Chase et al. |
| 6,081,525 A | 6/2000 | Christie et al. |
| 6,097,722 A | 8/2000 | Graham et al. |
| 6,115,380 A | 9/2000 | Christie et al. |
| 6,128,305 A | 10/2000 | Hjalmtysson et al. |
| 6,134,673 A | 10/2000 | Chrabaszcz |
| 6,141,322 A | 10/2000 | Poretsky |
| 6,141,339 A | 10/2000 | Kaplan et al. |
| 6,141,410 A | 10/2000 | Ginzboorg |
| 6,144,671 A | 11/2000 | Perinpanathan et al. |
| 6,151,324 A | 11/2000 | Belser et al. |
| 6,154,445 A | 11/2000 | Farris et al. |
| 6,169,735 B1 | 1/2001 | Allen, Jr. et al. |
| 6,181,703 B1 | 1/2001 | Christie et al. |
| 6,185,219 B1 | 2/2001 | Christie |
| 6,185,288 B1 | 2/2001 | Wong |
| 6,195,332 B1 | 2/2001 | Tang |
| 6,195,714 B1 | 2/2001 | Li et al. |
| 6,222,820 B1 | 4/2001 | Hamami |
| 6,222,823 B1 | 4/2001 | Smith et al. |
| 6,252,952 B1 | 6/2001 | Kung et al. |
| 6,253,207 B1 | 6/2001 | Malek et al. |
| 6,262,992 B1 | 7/2001 | Nelson et al. |
| 6,282,191 B1 | 8/2001 | Cumberton et al. |
| 6,314,103 B1 | 11/2001 | Medhat et al. |
| 6,317,439 B1 | 11/2001 | Cardona et al. |
| 6,324,179 B1 | 11/2001 | Doshi et al. |
| 6,339,594 B1 | 1/2002 | Civanlar et al. |
| 6,343,079 B1 | 1/2002 | Way et al. |
| 6,359,859 B1 | 3/2002 | Brolin et al. |
| 6,363,411 B1 | 3/2002 | Dugan et al. |
| 6,381,246 B1 | 4/2002 | Constantinof et al. |
| 6,396,840 B1 | 5/2002 | Rose et al. |
| 6,404,782 B1 | 6/2002 | Berenbaum et al. |
| 6,424,652 B1 | 7/2002 | Christie |
| 6,430,195 B1 | 8/2002 | Christie et al. |
| 6,438,131 B1 | 8/2002 | Gerber et al. |
| 6,463,062 B1 | 10/2002 | Buyukkoc et al. |
| 6,470,015 B1 | 10/2002 | Koga et al. |
| 6,483,837 B1 | 11/2002 | Howell et al. |
| 6,490,273 B1 | 12/2002 | DeNap et al. |
| 6,516,350 B1 | 2/2003 | Lumelsky et al. |
| 6,535,483 B1 | 3/2003 | Christie et al. |
| 6,535,507 B1 | 3/2003 | Li et al. |
| 6,535,991 B1 | 3/2003 | Gallant et al. |
| 6,560,226 B1 | 5/2003 | Torrey et al. |
| 6,563,794 B1 | 5/2003 | Takashima et al. |
| 6,563,816 B1 | 5/2003 | Nodoushani et al. |
| 6,614,781 B1 | 9/2003 | Elliott et al. |
| 6,633,569 B2 | 10/2003 | Hemmady |
| 6,643,258 B1 | 11/2003 | Ise et al. |
| 6,661,795 B1 | 12/2003 | Adas et al. |
| 6,661,882 B1 | 12/2003 | Muir et al. |
| 6,671,271 B1 | 12/2003 | Takemura et al. |
| 6,674,746 B1 | 1/2004 | Lamarque, III |
| 6,687,265 B1 | 2/2004 | Matsuo |
| 6,690,656 B1 | 2/2004 | Christie et al. |
| 6,704,327 B1 | 3/2004 | Gardner et al. |
| 6,714,544 B1 | 3/2004 | Bosloy et al. |
| 6,721,284 B1 | 4/2004 | Mottishaw et al. |
| 6,731,627 B1 | 5/2004 | Gupta et al. |
| 6,751,222 B1 | 6/2004 | Noake et al. |
| 6,754,180 B1 | 6/2004 | Christie |
| 6,754,322 B1 | 6/2004 | Bushnell |
| 6,757,278 B1 | 6/2004 | Bi et al. |
| 6,757,285 B1 | 6/2004 | Lakhani et al. |
| 6,765,931 B1 | 7/2004 | Rabenko |
| 6,775,266 B1 | 8/2004 | Furtenback et al. |
| 6,788,649 B1 | 9/2004 | Dugan et al. |
| 6,822,961 B1 | 11/2004 | Constantinof et al. |
| 6,832,254 B1 | 12/2004 | Scoggins et al. |
| 6,876,677 B1 | 4/2005 | Kise |
| 6,888,833 B1 | 5/2005 | Howell |
| 6,895,088 B1 | 5/2005 | Nelson et al. |
| 6,915,521 B1 | 7/2005 | Monteiro |
| 6,917,619 B1 | 7/2005 | Waldman |
| 6,931,010 B2 | 8/2005 | Gallant et al. |
| 6,999,419 B2 | 2/2006 | Ise et al. |
| 7,002,915 B1 | 2/2006 | Huberman et al. |
| 7,133,417 B1 | 11/2006 | Kao et al. |
| 7,245,630 B1 | 7/2007 | Chen et al. |
| 7,283,512 B2 | 10/2007 | Hall, Jr. |
| 7,283,518 B2 | 10/2007 | Vikberg et al. |
| 7,436,851 B1 | 10/2008 | Chambers |
| 2002/0024945 A1 | 2/2002 | Civanlar et al. |
| 2002/0057693 A1 | 5/2002 | Gallant |
| 2002/0061017 A1 | 5/2002 | Shibuya |
| 2002/0061101 A1 | 5/2002 | Hall, Jr. et al. |
| 2002/0093947 A1 | 7/2002 | Allen et al. |
| 2002/0099854 A1 | 7/2002 | Jorgensen |
| 2003/0202647 A1 | 10/2003 | Liesenberg |
| 2004/0081174 A1 | 4/2004 | Lakhani et al. |
| 2004/0179531 A1 | 9/2004 | Bi et al. |
| 2006/0274735 A1 | 12/2006 | Allen et al. |

\* cited by examiner

| SUBSCRIBER | ATM ADDR. | CLP ID | POLICY FEATURE | | | | | | | |
|---|---|---|---|---|---|---|---|---|---|---|
| | | | SAV | CMR | DAS | SAS | CMBS | CBW | CSCS | CMC |
| | | | 310A | 310B | 310C | 310D | 310E | 310F | 310G | 310H |
| • | • | • | | | | | | | | |
| • | • | • | | | | | | | | |
| • | • | • | | | | | | | | |
| • | • | • | | | | | | | | |
| • | • | • | | | | | | | | |

FIG. 3

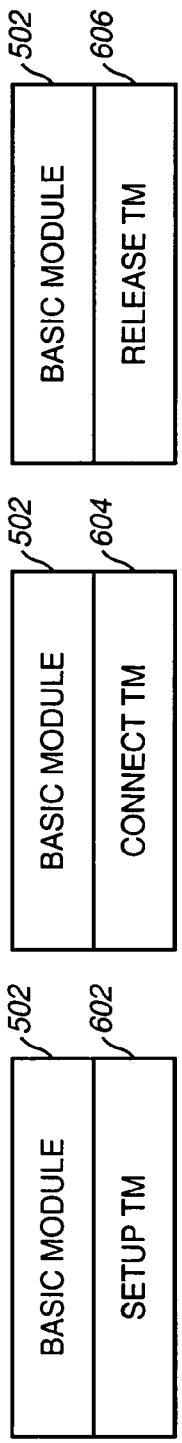

INTELLIGENT POLICY SERVER SYSTEM AND METHOD FOR BANDWIDTH CONTROL IN AN ATM NETWORK

PRIORITY STATEMENT UNDER 35 U.S.C. §119(e) & 37 C.F.R. §1.78

This nonprovisional application claims priority to and is a divisional of U.S. patent application No. 09/766,943, filed Jan. 22, 2001, which claims priority based upon the following prior U.S. provisional patent application entitled FAST MSCP, Ser. No. 60/176,928, filed Jan. 20, 2000 in the name of John K. Gallant, Steven R. Donovan, Terry A. Caterisano, Robert H. Barnhouse, David E. MeDysan, Saib Jarrar, Thomas Glenn Hall, Jr., and Terence A. Robb. These disclosures are hereby incorporated by reference for all purposes.

CROSS-REFERENCE TO RELATED APPLICATIONS

This application discloses subject matter related to the subject matter disclosed in the following co-assigned United States Patent Applications, each of which is incorporated herein by reference: (1) Method and Apparatus for Providing Reliable Communications in an Intelligent Network, filed Jan. 12, 2000, Ser. No. 09/481,910, in the names of: John K. Gallant, Cathleen A. McMurry, Robert H. Barnhouse, Steven R. Donovan, and Terry A. Caterisano; (2) Method and Apparatus for Providing Real-Time Call Processing Services in an Intelligent Network, filed Oct. 20, 1999, Ser. No. 09/421,827, in the names of: Ajay P. Deo, Henry Wang, Sami Syed, and Wendy Wong; (3) Intelligent Call Processing System for a Telecommunications Network (Next Generation Intelligent Network (NGIN)), filed Oct. 19, 1999, Ser. No. 09/420,666, in the names of: Ajay P. Deo, Alan Holmes, Andrew Dugan, Kenneth Fischer, Sami Syed, Terence A. Robb, and Wendy Wong; (4) Method and Apparatus for Supporting ATM Services in an Intelligent Network, filed Oct. 19, 1999, Ser. No. 09/420,657, in the names of: Andrew Dugan, David E. McDysan, and Sami Syed; and (5) Method and Apparatus for Managing Resources in an Intelligent Network, filed Oct. 19, 1999, Ser. No. 09/420,655, in the names of: Alan Holmes, Andrew Dugan, Kelvin Porter, and Terence A. Robb.

Further, this application is related to U.S. patent application Ser. No. 09/768,068, entitled Intelligent Network and Method for Providing Voice Telephony over ATM, and named John K. Gallant, Thomas Glenn Hall, Jr., and Robert H. Barnhouse as joint inventors; U.S. patent application Ser. No. 09/768,077, entitled Intelligent Newtork and Method for Providing Voice Telephony over ATM and Private Address Translation, and named John K. Gallant, Thomas Glenn Hall, Jr., and Steven R. Donovan as joint inventors; U.S. patent application Ser. No. 09/767,476, entitled Intelligent Network and Method for Providing Voice Telephony over ATM and Closed User Groups, and named Thomas Glenn Hall, Jr. and Steven R. Donovan as joint inventors; and U.S. patent application Ser. No. 09/768,069, entitled Intelligent Network and Method for Providing Voice Telephony over ATM and Point-to-Multipoint Connectivity, and named Thomas Glenn Hall, Jr. as inventor; U.S. patent application Ser. No. 09/768,070, entitled Intelligent Network and Method for Providing Voice Telephony over ATM and Alias Addressing, and named John K. Gallant as Inventor; all filed on Jan. 22, 2001, and all of which are hereby incorporated by reference for all purposes.

BACKGROUND OF THE INVENTION

1. Technical Field of the Invention

The present invention relates to telecommunication systems and, more particularly, to an intelligent policy server system and method for providing multiple service policy features or options, and for managing bandwidth usage in an Asynchronous Transfer Mode (ATM) network by enforcing appropriate policy features.

2. Description of Related Art

In telecommunication networks, two types of information must be transmitted between the nodes comprising the network: (i) user payload (e.g., voice, video, or data); and (ii) signaling information to control (e.g., set-up and tear-down) the logical paths carrying the payload. In the current telephone network, for example, the signaling information is carried by a separate network known as the common channel signaling (CCS) network. As an advancement over the CCS networks, it is desirable that the public switched networks be provided as multi-service, multi-protocol networks capable of carrying the signaling information in the same physical network.

Asynchronous transfer mode (ATM), as a networking technology, has been gaining increasing popularity as the desirable fabric for the Broadband Integrated Services Digital Networks (B-ISDN) which provide such diverse services as voice, multimedia, data, imaging, real-time video, video-to-home, et cetera, wherein the signaling information is carried in the same physical network, but over a separate logical connection. ATM technology, which is perceived to be the underlying technology for the high speed networks of the future, is highly scalable in terms of access speeds (ranging from as low as 1.5 Mbps to as high as 1.2 Gbps and more), in terms of geography and topology (Local Area Networks, Wide Area Networks, etc.), and in terms of application traffic.

One characteristic of ATM networks is that they are connection oriented, that is, before two end nodes can communicate they need to establish a connection between them. However, unlike circuit-switched networks (e.g., the Public Switched Telephone Network or PSTN), the connection between the two end points does not consume a fixed bandwidth. Instead, bandwidth is allocated statistically, whereby a large number of connections can share the bandwidth of individual links in the network. That is, the connection is virtual and does not exist physically. Each node in the path decides the route that it will use when information packets begin flowing. Since these connections are not dedicated bandwidth channels, they are commonly referred to as Virtual Channel Connections (VCCs) or Virtual Circuits (VCs), wherein one of the VCs of the individual links may be used for carrying signaling information.

VCCs between two endpoints disposed in an ATM network can be established in one of at least two ways:

By provisioning: These VCCs are called permanent virtual circuits (PVCs) which are established by configuring each network element along the path with the required information to establish an end-to-end VCC.

By signaling: These VCCs are called switched virtual circuits (SVCs) which are established on demand by the communicating end systems using known dynamic protocol messaging.

In the provisioning method, the virtual circuits are permanently configured and left in place until the subscribers want them to be removed. Typically, no special signaling protocol is required to handle control signaling (i.e., set-up and tear-down) of the PVCs. On the other hand, the SVCs are created and destroyed dynamically as needed and, accordingly, require a signaling protocol for exchanging messages necessary to set up and tear down SVC connections.

Signaling across ATM networks to establish SVCs is broadly divided into two functional parts: (a) signaling between the user equipment and the network at the access; (b)

signaling between network elements within the network core. The former is referred to as the User Network Interface (UNI) and the latter is referred to as the Network-Node Interface or Network-Network Interface (NNI).

Due to concerted efforts among several governing bodies, standards have emerged for both UNI and NNI signaling. As is well-known, these standards have facilitated multi-vendor and interoperable network environments in the ATM implementations today, thereby giving rise to service-based market differentiation and segmentation.

Because of the ever-increasing hold of the ATM on today's public and private networks, service providers are being challenged to give their customers various service options such as, for example, guaranteed Quality of Service (QoS) that the customers desire while maximizing the use of the bandwidth in the network. Furthermore, as the ATM networks gain in popularity, issues such as network reliability, resource management, robustness in terms of immunity to malicious attacks, et cetera, have become increasingly significant.

SUMMARY OF THE INVENTION

Accordingly, the present invention is related to an intelligent policy server system and method for providing multiple service policy features or options, and for managing bandwidth usage in an ATM network. Signaling messages generated at the user-network interface (i.e., an edge switch) prior to establishing an end-to-end switched virtual circuit are intercepted by a signaling intercept processor for effectuating policy features or permissions by executing appropriate service logic at the policy server associated with the edge switch, which policy server is also referred to as a Multi-Service Control Point or MSCP. A return message from the policy server determines whether a call connection can be made through the network or not. Profile arrays are provided which define feature authorizations and provisioning for subscribers and Customer Logical Ports (CLPs) served by the edge switches. Depending on the triggers associated with a signaling message received in the edge switch, a particular feature is invoked and executed by the policy server. Source address validation, address screening, burst-size limit, class-of-service provisioning, maximum concurrent call connections in progress, bandwidth control, and call frequency rate limit are provided as exemplary features implemented in a presently preferred exemplary embodiment of the present invention, wherein each feature is independently provisionable and enforceable.

In one aspect, the present invention is directed to an intelligent policy server method in an ATM network having an ingress switch and an egress switch, wherein ingress switch serves an ingress device operated by a calling party and the egress switch serves an egress device operated by a called party. When a signaling message from the ingress device is received in the ingress switch, the signaling message is provided to a signaling intercept processor associated with the ingress switch, which then propagates the signaling message to a policy server associated therewith. The policy server supports least one policy profile having one or more port-based and/or subscriber-based policy features and includes various data elements provisionable at the time of feature authorization for effectuating the particular policy or feature pursuant to the signaling message. A determination is made in the policy server, based at least in part on the signaling message, policy profile authorized for a port, et cetera, if a particular policy feature is to be invoked. If so, a further determination is made in the policy server whether a policy condition associated with the invoked policy feature is satisfied with respect to the signaling message. If the invoked policy feature is determined to pass validation, a connection path between the ingress switch and the egress switch is established subsequently.

In another aspect, the present invention provides an ATM network for effectuating intelligent policy features with respect to a call to be established between two parties via a virtual channel connection. The network comprises an ATM switch serving a customer premises equipment (CPE) operated by a party with respect to the call. A signaling intercept processor associated with the ATM switch is provided for intercepting a signaling message relative to the call, which then propagates the message to a policy server associated therewith. The policy server includes at least one policy profile having a plurality of policy features, wherein the policy server operates to effectuate a particular policy feature with respect to the call when triggered by the signaling message received from the signaling intercept processor.

In yet another aspect, the present invention is directed to a computer-readable medium operable with an ATM network node. The computer-readable medium carries a sequence of instructions provided for executing service logic which, when executed by a processing entity associated with the ATM network node, causes the ATM network node to perform the following steps. Upon receiving in the ATM network node a signaling message with respect to a call from a party, the signaling message is propagated to a policy server operably associated with the ATM network node. Thereafter, a determination is made in the policy server whether a policy condition associated with a particular policy feature to be invoked is satisfied with respect to the signaling message. If so, an intelligent treatment is effectuated for the call based on the particular policy feature.

In a further aspect, the present invention provides a memory structure for storing data usable in effectuating intelligent policy features in an ATM network wherein the memory structure is operable with a processing entity associated with a policy server node disposed in the ATM network. A data structure is included which contains a list of subscribers authorized to access the ATM network to setup virtual channel connections for service. Each of the subscribers is provided with an ATM address and a CLP ID associated therewith. A profile array associated with the subscribers is provided wherein a policy feature record is populated for each subscriber with at least one policy feature which indicates a specific treatment for a call to be effectuated relative to the subscriber.

BRIEF DESCRIPTION OF THE DRAWINGS

A more complete understanding of the present invention may be had by reference to the following Detailed Description when taken in conjunction with the accompanying drawings wherein:

FIG. 3 depicts an exemplary profile array for effectuating multiple policy features in the ATM network provided in accordance herewith;

FIGS. 6A-6C depict, respectively, basic TDR structures for three signaling messages operable with the ATM network;

DETAILED DESCRIPTION OF THE DRAWINGS

Figure 1:
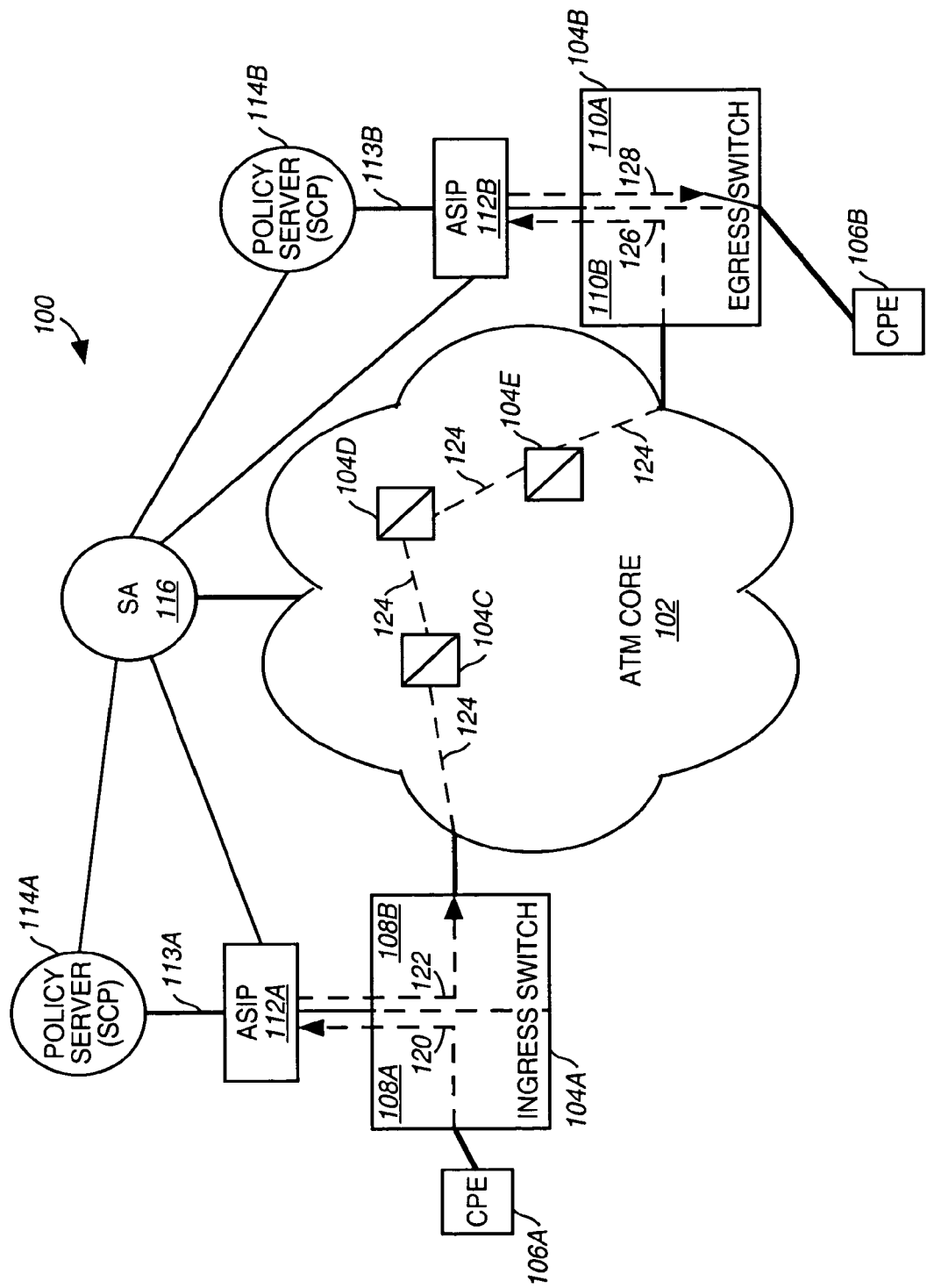
FIG. 1 depicts a functional block diagram of a presently preferred exemplary embodiment of an ATM network wherein an intelligent policy server system and method is provided in accordance with the teachings of the present invention.

In the drawings, like or similar elements are designated with identical reference numerals throughout the several views thereof, and the various elements depicted are not necessarily drawn to scale. Referring to FIG. 1, depicted therein is a functional block diagram of a presently preferred exemplary embodiment of an ATM network 100 wherein an intelligent policy server system and method is provided in accordance with the teachings of the present invention. The exemplary ATM network 100 is illustratively provided as an ATM core 102 disposed between two edge nodes, an ingress switch 104A and an egress switch 104B. A plurality of ATM switches, e.g., switch 104C, switch 104D, and switch 104E, are exemplified within the ATM core 102.

For purposes of the present invention, the terms "ingress" and "egress" are used for denoting the directionality of an end-to-end call connection. However, with respect to individual network ports, the directionality is defined in reference to whether message flow is towards the network (i.e., forward (FWD) direction) or from the network (i.e., backward (BWD) direction). Accordingly, it should be recognized that what is forward direction with respect to an ingress port becomes backward direction for an egress port and vice versa. Significance of these distinctions will become more apparent as the teachings of the present invention are set forth in greater detail hereinbelow.

The ingress switch 104A is operable to serve a user or subscriber (e.g., a calling/originating party) operating an ingress device such as customer premises equipment (CPE) 106A through a network port (not shown). Several network ports may be provided to be operable with the ingress switch 104A and these network ports can be full physical ports or Customer Logical Ports (CLPs). A CLP may be provided as a subset of, or derived from, a network physical port. For example, one or more Digital Signal Level 1 (DS-1) CLPs (operable at 1.544 Mbps) may be derived from a single Digital Signal Level 3 (DS-3) network port operable at 44.736 Mbps. The egress switch 104B is similarly operable to serve a user or subscriber (e.g., a called/terminating party) operating an egress device such as CPE 106B through a CLP.

Those skilled in the art should recognize that the ingress and egress devices are operable to access the ATM core 102 via the edge switches for setting up a VCC by standardized signaling engaged prior to establishing a communication session. As is well-known, signaling between user equipment and the network at the access is standardized under the International Telecommunication Union (ITU) as ITU Recommendations Q.2931, Q.2971, and Q29xx series, and as User Network Interface (UNI) 4.0 under the ATM Forum.

In accordance with the teachings of the present invention, signaling messages received at the serving end switches are intercepted for effectuating an intelligent policy server mechanism in order to not only manage the network resources (e.g., bandwidth) more efficiently and protect the network core, but also to implement various service features that subscribers may desire. Accordingly, each end switch is coupled to an ATM signaling intercept processor (ASIP) which intercepts signaling messages received at the end switch and is operable to provide the intercepted signaling message to a Multi-Service Control Point (MSCP) or policy server associated therewith. For instance, in the exemplary ATM network 100 shown in FIG. 1, the ingress switch 104A is operable with ASIP 112A which executes real-time call models and is, in turn, operably associated with the policy server 114A. In similar fashion, the egress switch 104B is coupled to ASIP 112B which is operable with MSCP 114B. A system administrator (SA) node 116 coupled to the various policy servers and ASIPs is provided for centralized service/policy provisioning, network administration and control, database maintenance, and customer/user interfacing.

The functionality of each edge switch may be segmented into a pass-through device-side portion which interfaces with the CPE via an appropriate CLP and a network-side portion which acts like a switch and interfaces with the ATM core. With respect to the ingress switch 104A, a device-side portion 108A is interfaced with CPE 106A and a network-side portion 108B is interfaced to the core 102. Similarly, the egress switch 104B is comprised of a device-side portion 110A and a network-side portion 110B.

When a signaling message is received in the device-side portion 108A, the ingress switch 104A is operable to provide the signaling message to ASIP 112A. Upon receiving the signaling message, ASIP 112A provides the message to the policy server 114A via an interface 113A effectuated by means of the Data Network Access Protocol (DNAP). As will be described in greater detail hereinbelow, appropriate service logic is executed in the policy server 114A when one or more policy triggers are detected with respect to the signaling message received at the ingress switch 104A. Thereafter, a return result is provided to the ingress switch 104A via ASIP 112A for appropriate treatment with respect to the incoming signaling message.

Analogously, a signaling message propagating from the ATM core 102 towards the egress switch 104B is received in the network-side portion 110B thereof and is appropriately treated by ASIP 112B and the policy server 114B associated therewith via the DNAP interface 113B. The end-to-end passage of an exemplary signaling message in the network 100 is illustrated by message path segments 120 and 122 in the ingress switch 104A, message path segments 124 in the core network 102, and message path segments 126 and 128 in the egress switch 104B.

Those skilled in the art should appreciate upon reference hereto that the ASIP, policy server, and switch components at the ingress and/or egress sides may be integrated in any known or hitherto unknown manner into a single node, or a compartmentalized or co-located network element in any combination. Furthermore, a single policy server may be operable to serve both the ingress and egress sides of the network as well, wherein each side is provided with its own ASIP.

Figure 2A:
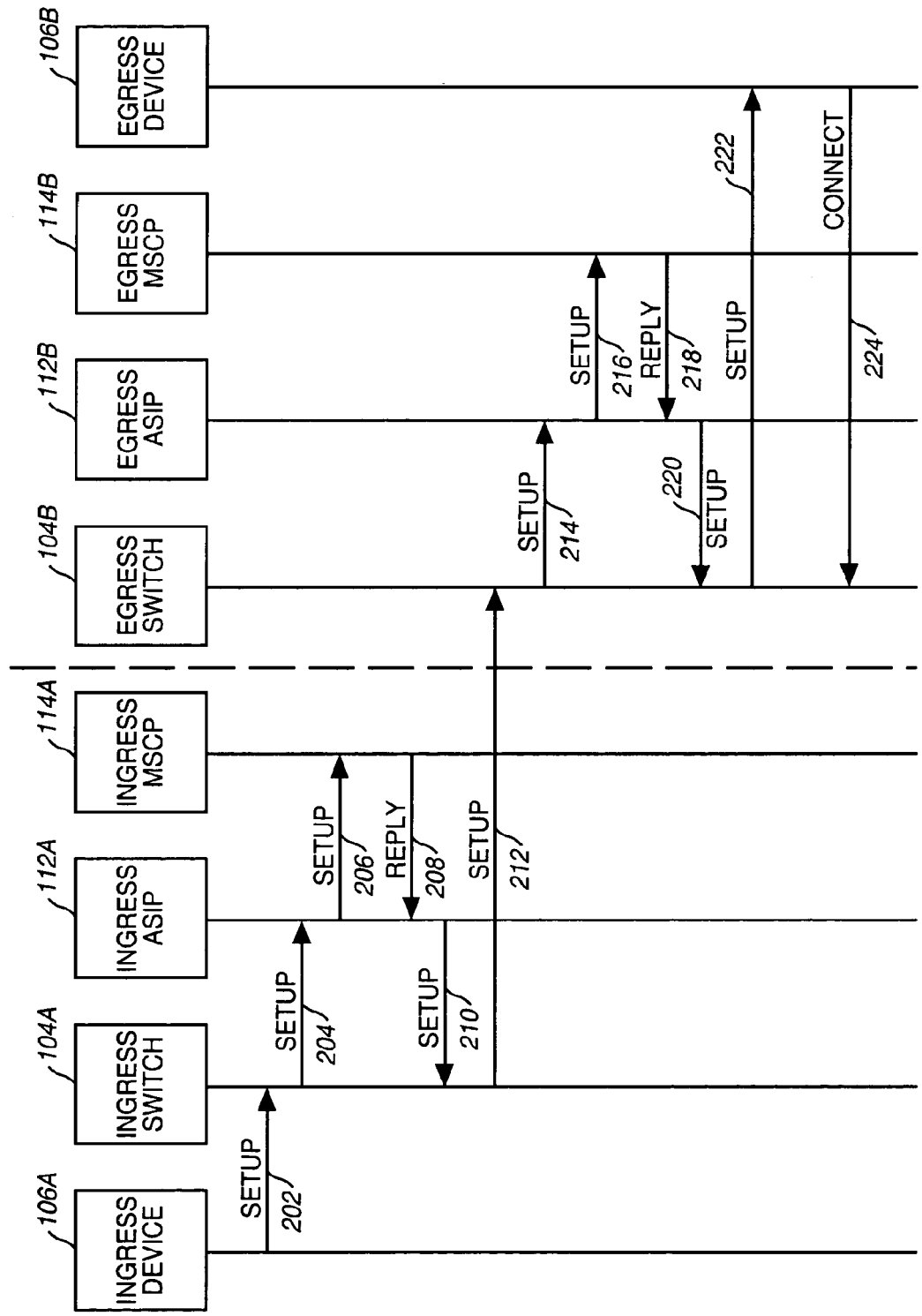
FIGS. 2A and 2B depict a message flow diagram for an exemplary call connection process operable with the ATM network of the present invention.
Figure 2B:
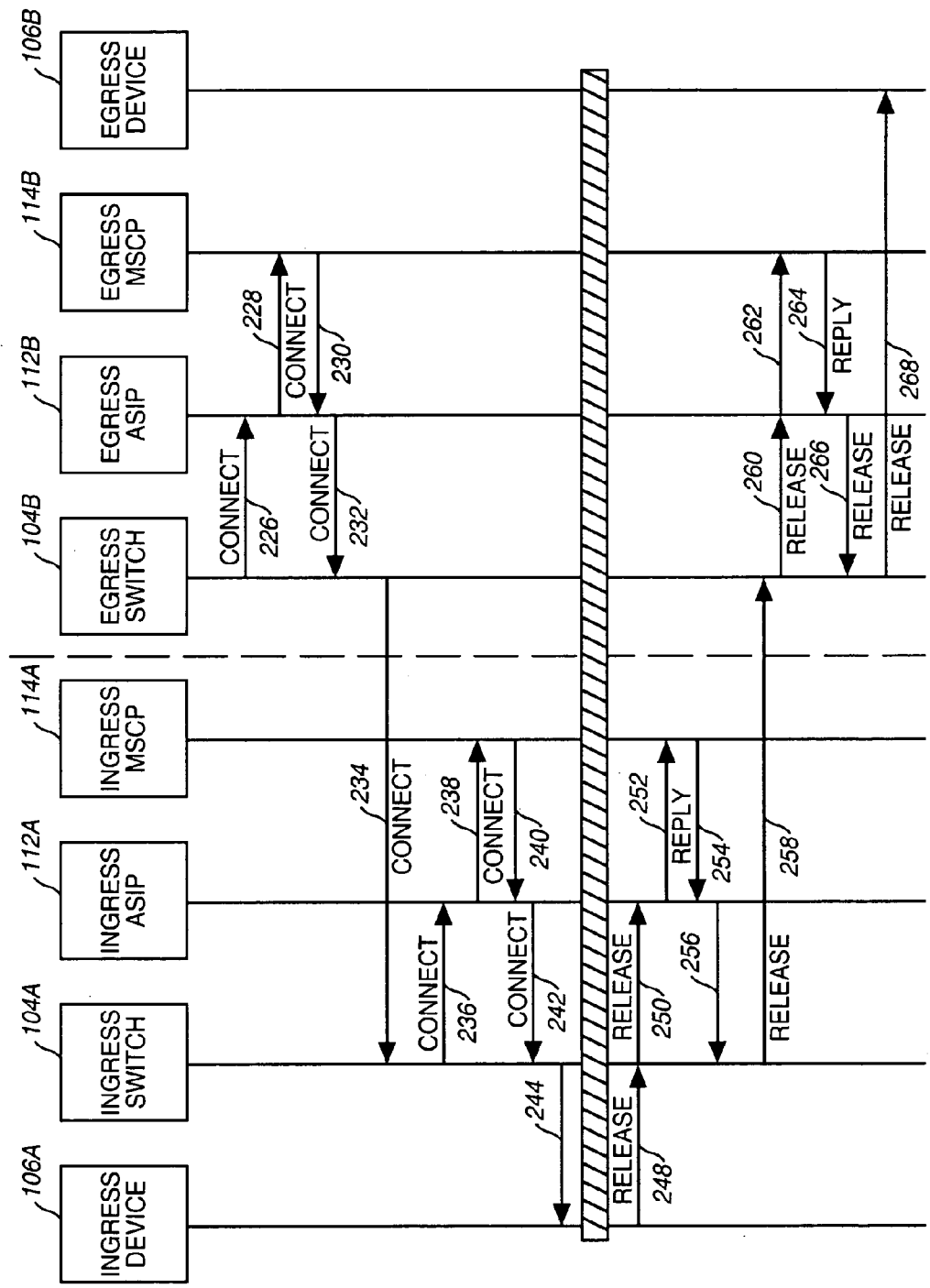

Referring now to FIGS. 2A and 2B, depicted therein is a detailed message flow diagram for an exemplary basic call connection process in the ATM network 100. When the ingress device 106A generates a Setup message 202, it is first received in the ingress switch 104A. Thereafter, the Setup message is propagated to the ingress MSCP 114A (i.e., policy server) via ASIP 112A as exemplified by message paths 204 and 206. A Setup Reply message 208 is returned in response from the ingress MSCP 114A to the ingress ASIP 112A upon executing applicable service logic. Depending upon the Reply message 208, the Setup is propagated from the ingress ASIP 112A to the ingress switch 104A (exemplified by message path 210) which, thereafter, launches the Setup message across the network towards the egress switch 104B (exemplified by message path 212).

The egress switch 104B then propagates the Setup message to the egress MSCP 114B via ASIP 112B (exemplified by message paths 214 and 216). Upon executing appropriate service and feature logic, if applicable, a Reply message 218 is returned from the egress MSCP 114B to ASIP 112B. Depending upon the contents of the Reply message 218, ASIP 112B propagates the Setup message (exemplified by message path 220) to the egress switch 104B. Thereafter, the Setup message is forwarded to the egress device 106B (exemplified by message path 222) which responds thereto by generating a Connect message 224.

The Connect message 224 is then propagated back to ingress switch 104A across the network core (exemplified by message paths 226-242 which include appropriate Connect Reply messages 230 and 240 between the MSCPs and associated ASIPs). As will be seen in greater detail hereinbelow, a small amount of feature processing operates on the Connect message, mainly to ensure that the bandwidth calculations made for the Setup message are still applicable, that is, no other connection acquired the bandwidth during the time interval between the Setup and Connect processes. The ingress switch 104A forwards the Connect message to the ingress device (exemplified by message path 244). An end-to-end virtual circuit is then established for conducting a communication session 246 (e.g., a voice, video or data call; hereinafter a "call") between the parties.

At the end of the communication session 246, the end-to-end virtual circuit is taken down by a Release message originated from, e.g., the ingress device 106A towards its switch 104A (exemplified by message path 248), which is propagated across the network to the egress device 106A (exemplified by message paths 250-268 which include appropriate Release Reply messages 254 and 264 between the MSCPs and associated ASIPs).

FIG. 3 depicts an exemplary profile array database 300 available to the MSCPs for effectuating multiple policy features in the ATM network described hereinabove. A list of subscribers or customers 302 is provided with network addresses or address ranges 304. Each customer is associated with one or more CLPs identified for its use (reference numeral 306). A policy feature portion 308 of the database 300 identifies the various features that are authorized and/or activated for a specific subscriber or network port. In the exemplary policy feature portion 308, the following eight features are set forth:

Source address validation (SAV) 310A;
Customer port maximum call attempt rate limit (CMR) 310B;
Destination address screening (DAS) 310C;
Source address screening (SAS) 310D;
Customer port maximum burst-size limit (CMBS) 310E;
Customer port aggregate bandwidth limit (CBW) 310F;
Customer port service class selection (CSCS) 310G; and
Customer port maximum concurrent calls-in-progress limit (CMC) 310H.

A CLP profile table (not explicitly shown in FIG. 3) is also provided in the system database which contains a list of valid CLPs supported by the network. Preferably, a profile record is created each time a CLP is added to the network, wherein the record information is used to determine the authorization status and parameter values for port-related features. The following data are preferably provided in a CLP record which will be described in greater detail below in reference to specific feature implementation: CLP ID; port type (e.g., shared IP or dedicated ATM); customer ID; SAV status (authorized for the port or not); CMR status (authorized for the port or not); CMR limit; CMC status (authorized for the port or not); CMC limit; maximum burst-size forward (in cells); maximum burst-size backward (in cells); CBW status (authorized for the port or not); CBW forward limit (customer port bandwidth limit in forward direction, in cells per second); CBW backward limit (customer port bandwidth limit in backward direction, in cells per second); overbooking factors in forward and backward directions for different classes of service; and CSCS status (a composite value that defines the different COSs available for the indicated CLP.

Figure 4A:
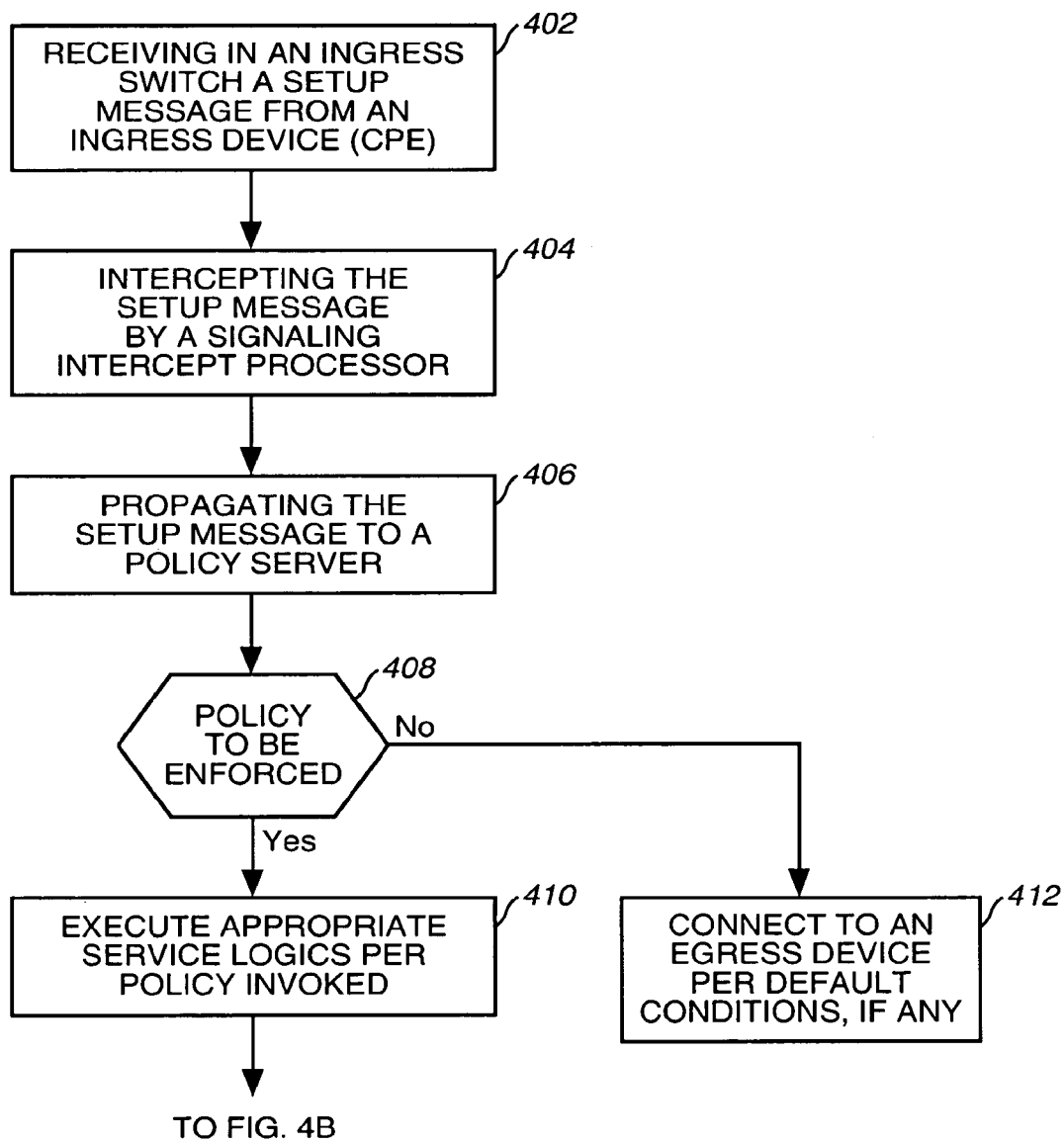
FIGS. 4A and 4B depict a flow chart of the steps involved in effectuating an exemplary policy server method in accordance with the teachings of the present invention.
Figure 4B:
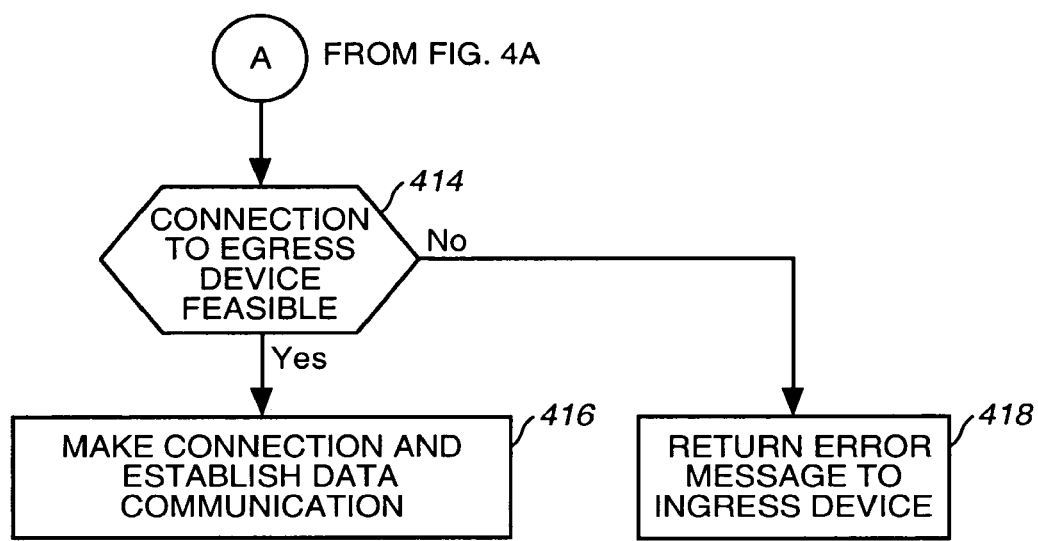

FIGS. 4A and 4B depict a flow chart of the steps involved in effectuating an exemplary policy server method in an ATM network provided in accordance with the teachings of the present invention. Upon receiving a signaling message (e.g., a Setup message) in an ingress switch (step 402), the message is intercepted by a signaling intercept processor (step 404). Thereafter, the signaling message is propagated to a policy server associated with the signaling intercept processor (step 406). A determination is made in the policy server whether a policy is to be enforced with respect to that signaling message (decision block 408). This determination is preferably based on the parameters received in the signaling message, past information retained for the CPE/CLP combination generating the message, and provisioning information such as, e.g., the CLP profile tables and subscriber profiles, etc. described hereinabove.

Subsequently, if it is determined that a policy or feature is to be effectuated, appropriate service logic is executed in the policy server (step 410). Otherwise, a call connection is made to an egress device under default conditions, if any (step 412). Upon executing the service logic based on particular feature(s) triggered, a determination is made whether a call connection to the egress device is permissible (decision block 414). If so, the connection is set up such that a voice/data communication session between the ingress and egress devices ensues (step 416). On the other hand, if the call connection is denied, for example, on account of a failed feature, the service logic returns an error code. A suitable error message is then propagated to the ingress device (step 418).

Figure 5A:
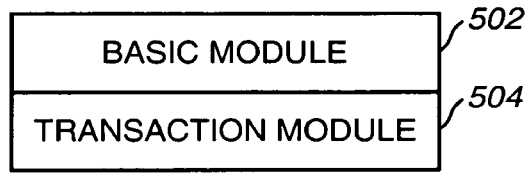
FIGS. 5A-5C depict exemplary Transaction Detail Records (TDRs) created in an intelligent policy server pursuant to enforcing service policies or permissions in accordance with the teachings of the present invention.
Figure 5B:
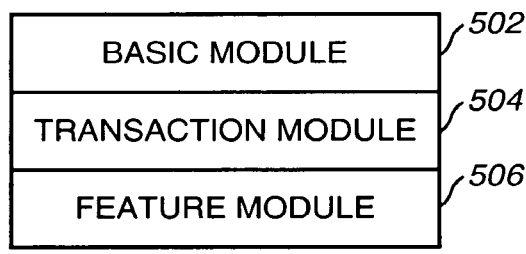
Figure 5C:
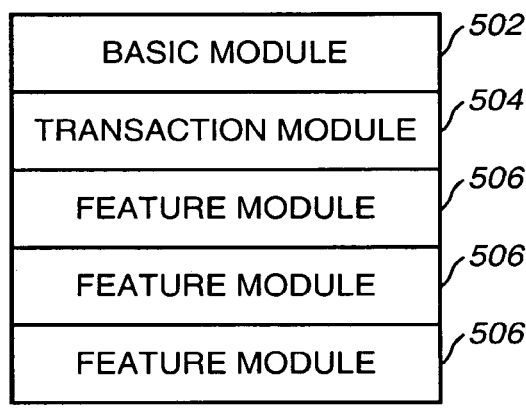

Referring now to FIGS. 5A-5C, depicted therein are exemplary Transaction Detail Records (TDRs) created in the policy server pursuant to enforcing policy features in accordance with the teachings of the present invention. The records are preferably identified and defined based on the DNAP messaging between the policy server and its associated ASIP and the feature-specific data information.

TDRs are generated by the policy server when it receives any operation requests from its ASIP. Preferably, the purpose of TDR generation is to capture and record application service information which can be utilized by the SA node in the network to report to the customer cockpit.

FIG. 5A depicts a basic TDR structure which comprises a basic module 502 (which contains information such as, e.g., CLP ID, call reference, etc.) which is provided as the first module of a TDR. In a presently preferred exemplary embodiment, only one basic module per TDR is allowed. Appended to the basic module 502 is a transaction module (TM) 504 which contains information that is related to a specific operation (e.g., Setup, Connect, Release, AddParty, AddPartyAck, AddPartyReject, and DropParty). Only one transaction module is preferably provided for each TDR.

FIGS. 5B and 5C depict TDR structures with one or several feature modules (FMs) 506 appended to the basic TDR structure described in the foregoing. The feature module 506 comprises feature-related information and each feature alluded to hereinabove in reference to FIG. 3 is provided with its own module. Since a feature module is generated from the result of an invocation of a feature, the FM is preferably always appended to one transaction module. That is, the FM is not provided as a stand-alone module. Several FMs can be appended to a single TM because multiple feature invocations can occur as a result of a single operation request.

Each TDR module element (e.g., basic module) preferably contains a module header comprised of three fields: module type, module length, and version. Each TM contains a status field indicating the success or failure of the transaction. Similarly, each FM contains a result indication the success or failure of the feature processing. Furthermore, in a presently preferred exemplary embodiment of the present invention, FMs are created in order of the feature invocation sequence where multiple features are involved.

FIGS. 6A-6C depict basic TDR structures for three exemplary signaling messages operable with the ATM network. In FIG. 6A, a Setup TM 602 is appended to the basic module 502 wherein no features are invoked. A Connect TM 604 is exemplified in the TDR structure shown in FIG. 6B. A Release TM 606 is exemplified in the TDR structure shown in FIG. 6C. In similar fashion, other operations may also generate appropriate TDRs with suitable TMs.

Figure 7A:
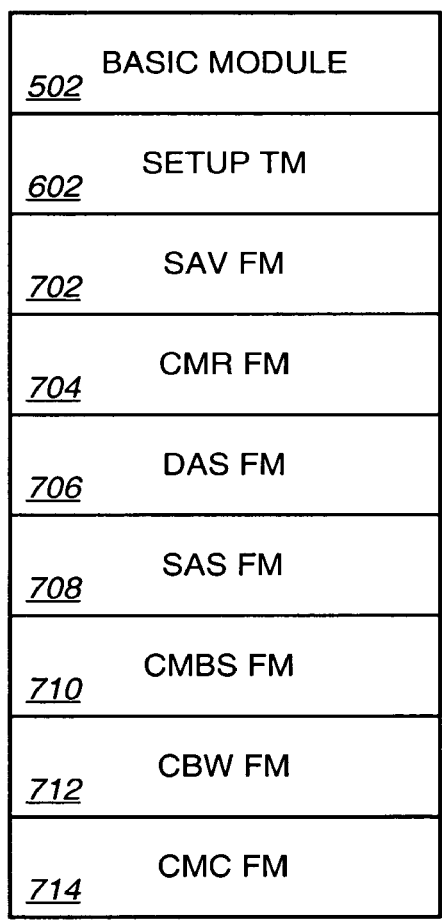
FIGS. 7A-7D depict TDRs with exemplary Feature Modules (FMs) for effectuating various policies in the ATM network.
Figure 7B:
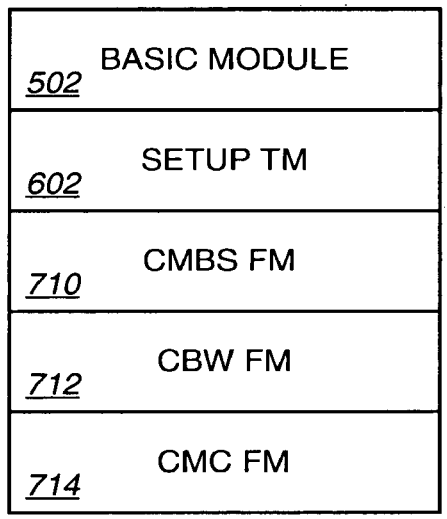
Figure 7C:
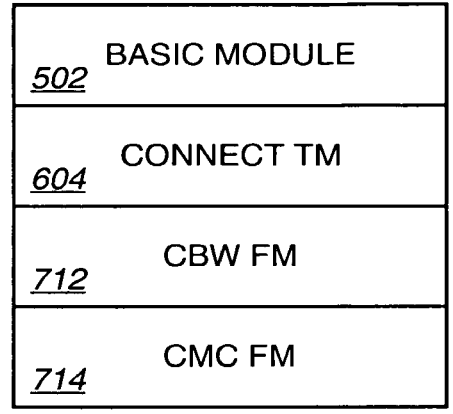
Figure 7D:
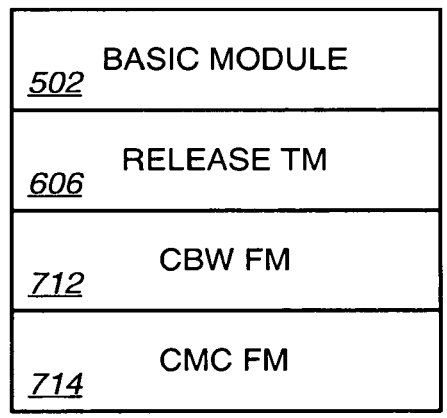

Referring now to FIGS. 7A-7D, depicted therein are TDR structures with exemplary FMs for different operations used in effectuating ATM connections. In particular, FIG. 7A depicts a TDR generated when a Setup message is received in an ingress switch with a plurality of features being invoked. The TDR structure includes the following FMs in addition to the basic module 502 and the Setup TM 602: a SAV TM 704, a CMR FM 704, a DAS FM 706, a SAS FM 708, a CMBS FM 710, a CBW FM 712, and a CMC FM 714. FIG. 7B depicts a TDR for an egress Setup message, which includes the following FMs: CMBS FM 710, CBW FM 712, and CMC FM 714. Similarly, the TDR structures shown in FIGS. 7C and 7D correspond to ingress/egress Connect and Release operations, respectively, with CBW FM 712 and CMC FM 714.

The structure of the basic module 502 includes the following data: module type (basic, TM, or FM), module length (total number of octets in module), total TDR length, network call correlation ID, sequence number (generated by MSCP that identifies the TDR), number of FMs included in the TDR, call reference (identifies the call at the originating UNI), CLP ID, endpoint type (i.e., ingress or egress node), IP address of back-end processor (i.e., MSCP) handling the transaction, IP address of the ASIP that generated the transaction, and a timestamp.

Analogously, the various TMs associated with different operations include appropriate transaction-specific information. For example, the structure of the Setup TM 602 which is generated by the MSCP when it receives a Setup operation request can include the following data: module type, module length, status (indicates success or failure of the transaction), calling party number, called party number, subaddresses of the parties, broadband bearer capability of the subscriber, ATM traffic descriptor (a composite field copied from the Setup message and includes peak and sustainable cell rates, cell loss priorities, best effort indicator, etc.), quality of service (QoS) of the connection, service category (i.e., Class of Service), overbooking factors for forward and backward directions for the current COS, and an endpoint reference (which identifies a leaf in a root-initiated Point-to-Multipoint call).

The FMs created in the MSCP when the features are invoked also include appropriate feature-specific data. In general, a result is indicated in the FMs to signify whether invocation of a feature or policy is a success or failure. Additional data is included depending upon the particular feature. For instance, the SAV FM includes a result obtained upon invocation of the feature (which indicates a success or failure) and the number of user address bits that is a prefix to the calling party address. The CMR FM includes a result of the feature invocation, timestamp, CMR period length (time duration in which the call attempts are counted), current count (number of call attempts in the most recent CMR period, and rate limit (i.e., maximum number of call attempts allowed in any CMR period). The SAS and DAS FMs include a call screening condition based on the screening lists in addition to the result of feature invocation. The CMBS FM includes the maximum forward and backward burst-sizes allowed for the CLP. The CBW FM includes the following data: requested forward and backward bandwidth as calculated from parameters in the Setup message (in cells/second), forward and backward bandwidth-in-use on the CLP at the time of the request (cells/second), and maximum forward and backward bandwidth allowed for the CLP. The CMC FM includes a current count (i.e., number of active calls for the CLP at the time of request) and a maximum count allowed fr the CLP.

Based upon the foregoing service feature architectural considerations, the implementation and operation of each particular feature in accordance with the teachings of the present invention is now set forth in greater detail immediately hereinbelow.

I. Source Address Validation

The SAV feature operates to ensure that only authorized users are allowed to access the core network through particular network ports. As alluded to hereinbefore, these network ports can be full physical ports or CLPs. Multiple users, as differentiated by the ATM addresses, are able to access the network through a single CLP.

The SAV feature may be provisioned with address prefixes which comprise an ATM address plus an integer defining the number of leading octets used in address comparisons. For example, a customer may want all addresses starting with a specified octet prefix to pass SAV screening. In that case, the length specifier is set to the length of the octet prefix, and the remaining octets of the ATM address are not compared. Thus, an address match is deemed to exist if the first specified number of the octets match.

The SAV feature is authorized on a per CLP basis. In a presently preferred exemplary embodiment of the present invention, an ATM address prefix is preferably limited to being mapped to a single CLP; whereas the policy server can support up to a maximum of 256 address prefixes associated with a CLP. The policy server supports the following CLP-specific data elements for implementing the SAV feature: CLP ID, SAV authorization, and a default calling party number for the CLP (used if a calling party number is not specified in the trigger message, e.g., a Setup message). During the provisioning, each of the elements is identified with respect to its treatment at the time of authorization or creation, post-creation, and whether modifiable by the user/subscriber. For example, the CLP ID element is mandatory at the time of authorization and is not modifiable after it is created. Also, it is not modifiable by the ATM user. Similarly, the SAV authorization element is mandatory at the time of authorization and is not modifiable by the user, although it may be modified by the system administrator after creation. On the other hand, the default calling party number element is optional at the time of authorization.

The policy server (i.e., MSCP) also supports a data structure wherein a customer ID is associated with a particular CLP. Further, a prefix range of the ATM addresses and prefix length are also specified therein. These elements are accorded specific treatment at the time of authorization and during post-creation, in addition to their user-modifiability. Preferably, a minimum of one record is required at the time of authorization. Further, a minimum of one record is required to be present for all time that the feature is authorized for a given Customer ID—Prefix Address pair.

Figure 8:
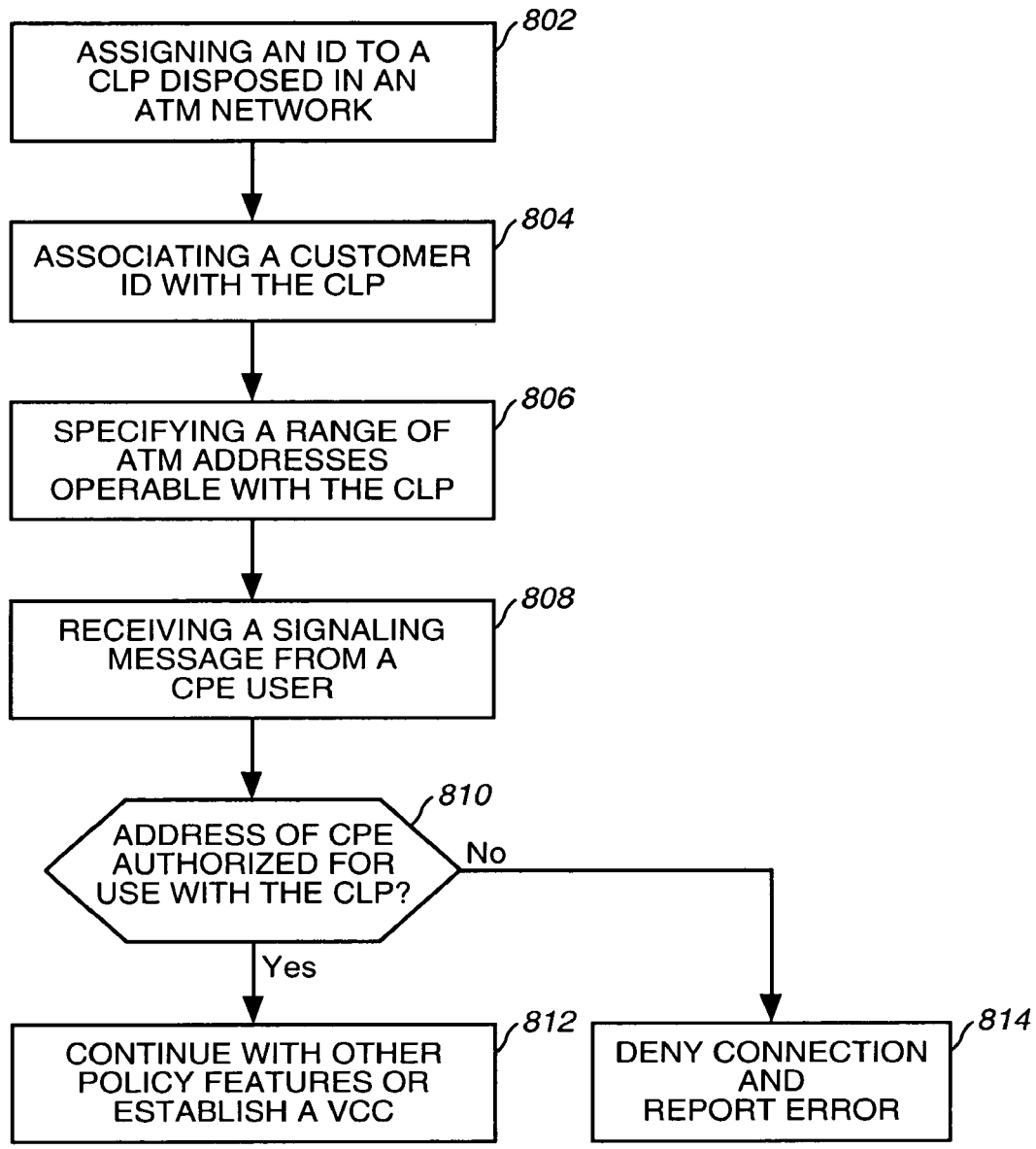
FIG. 8 is a flow chart of a method for effectuating a source address validation feature in accordance with the teachings of the present invention.

FIG. 8 depicts a flow chart of an exemplary method for effectuating a source address validation feature in accordance with the teachings of the present invention. As set forth above, an ID is assigned to a CLP disposed in an ATM network (step 802). A customer ID is then associated with the particular CLP (step 804) and a range of ATM addresses (for example, with prefixes) operable with the CLP are specified (step 806). Upon receiving a signaling message in the edge switch via the CLP (step 808) and when the SAV feature is activated for the CLP, a determination is made whether the address of the CPE generating the signaling message is within the range of ATM addresses authorized for use with CLP (decision block 810). If so, source address validation check passes and the process continues with other policy features, if any, or proceeds with establishing a VCC (step 812). If the user is not allowed to access through the particular CLP, then the source address validation step fails and the user is accordingly denied connection. An error report may also be provided pursuant to setup rejection (step 814).

II. Customer Port Maximum Call Attempt Rate Limit

The CMR feature provides a mechanism to count the number of call setup requests received from a CLP over a defined period of time (i.e., CMR period) and reject a call setup request if it results in exceeding the rate limit. Accordingly, it should be appreciated that this feature advantageously protects the ATM core network from being subjected to denial-of-service attacks wherein a malicious user may generate a large number of service requests to the network with the intention of overloading/incapacitating it.

In a presently preferred exemplary embodiment of the present invention, the CMR period is provisionable on a system-wide value basis. Authorization for the CMR feature is, on the other hand, effectuated on a per CLP basis. The policy server supports a CMR authorization status data element, CMR call attempt rate limit (which defines the maximum number of calls allowed per period), and the CMR period (in seconds). Preferably, these elements are not modifiable by the user and are mandatory at the time of authorization/activation. However, de-authorization of the CMR feature is possible in a presently preferred exemplary embodiment of the present invention.

Figure 9:
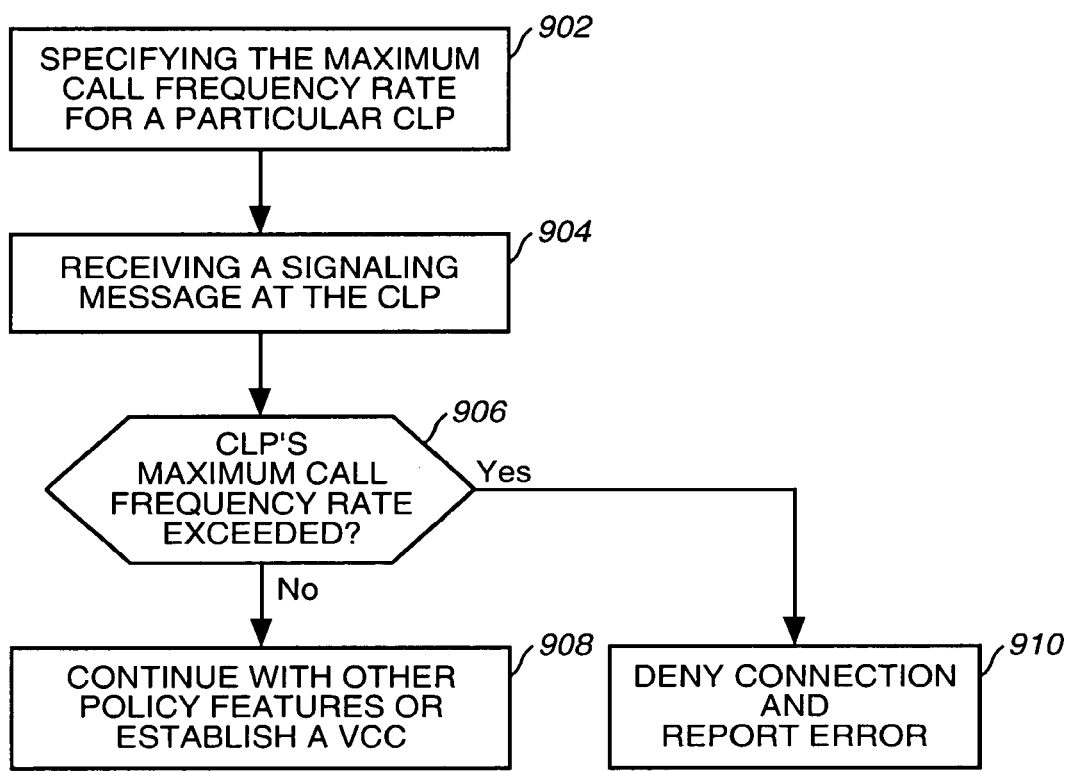
FIG. 9 is a flow chart of an exemplary method for effectuating a maximum call frequency rate feature in accordance with the teachings of the present invention.

FIG. 9 depicts a flow chart of a method for effectuating the CMR feature in accordance with the teachings of the present invention. As set forth above, a maximum call frequency rate is provisioned for the system on a per CLP basis (step 902). Upon invocation of the CMR feature when a signaling message (e.g., Setup) is received via the CLP for which the feature is provisioned (step 904), the policy server determines if the signaling message results in the maximum call frequency rate for the CLP being exceeded (decision block 906). If the CMR check indicates that the maximum call frequency has not been exceeded, then the check passes and the service logic continues with the other policy features, if any, or with the establishment of a VCC through the network (step 908).

On the other hand, if the CMR check indicates that the maximum call frequency rate for the CLP has exceeded because of the received signaling message, the CMR check fails. Thereafter, the user is denied connection through the network. An error report is preferably generated accordingly (step 910).

III. Destination Address Screening

The DAS feature is provisioned for an originating party such that a subscriber is allowed to define the addresses to which calls can be made through the network. Preferably, two types of screening are provided for each subscriber: (i) a group list, and (ii) a user list. In a presently preferred exemplary embodiment, each list is provided with two types of screening. The first type is a set of "positive" address ranges that a DAS subscriber is allowed to call (i.e., positive user list or positive group list). The second type is a set of "negative" address ranges that the DAS subscriber is not allowed to call (i.e., negative user list or negative group list). Preferably, the user list overrides the group list. Consequently, the call screening process is optimized by checking the user list first. The group list is checked for screening after the user list. Thus, if the user list check yields a definitive result, the group list check may be avoided.

In an exemplary embodiment of the present invention, the DAS feature may be provisioned as follows:

A user must be authorized for the DAS feature;
    As part of authorization, the user is required to supply ranges of addresses to include the DAS lists (positive and negative);
    Users may be allowed to share a DAS list;
    If multiple users share a DAS list, then de-authorization of a DAS subscriber may not result in the removal of the DAS addresses; and
    De-authorization of the DAS feature may result in removal of the subscriber's DAS addresses when the de-authorized subscriber is the only user using the DAS list.

The policy server preferably supports the following data elements for effectuating the DAS feature:

Calling party number (mandatory at authorization, not modifiable thereafter or by user);
    Called party number (mandatory at authorization, not modifiable thereafter or by user);

User group ID for identification of the user group profile (mandatory at authorization, not modifiable thereafter or by user);

DAS authorization status to indicate the authorization status for a particular user (mandatory at authorization; may be modifiable thereafter, but not by user);

DAS group list ID for identification of the group DAS list which is used for providing common address-screening to a group of users (mandatory at authorization if groups are involved; may be modifiable thereafter, but not by user);

DAS user list ID for identification of the user-specific DAS list which is used for providing a list addresses that is unique to a user (mandatory at authorization; may be modifiable thereafter, but not by user);

List ID for identification of a call-screening list (mandatory at authorization; may be modifiable thereafter, but not by user);

Entry type for identifying a call-screening set as a set of "allowed" addresses or as a list of "disallowed" addresses (mandatory at authorization; may be modifiable thereafter, but not by user);

Customer ID for identifying the customer (mandatory at authorization, not modifiable thereafter or by user); and Address range which includes the starting and ending points of an ATM address range (mandatory at authorization; may be modifiable thereafter, but not by user).

Figure 10:
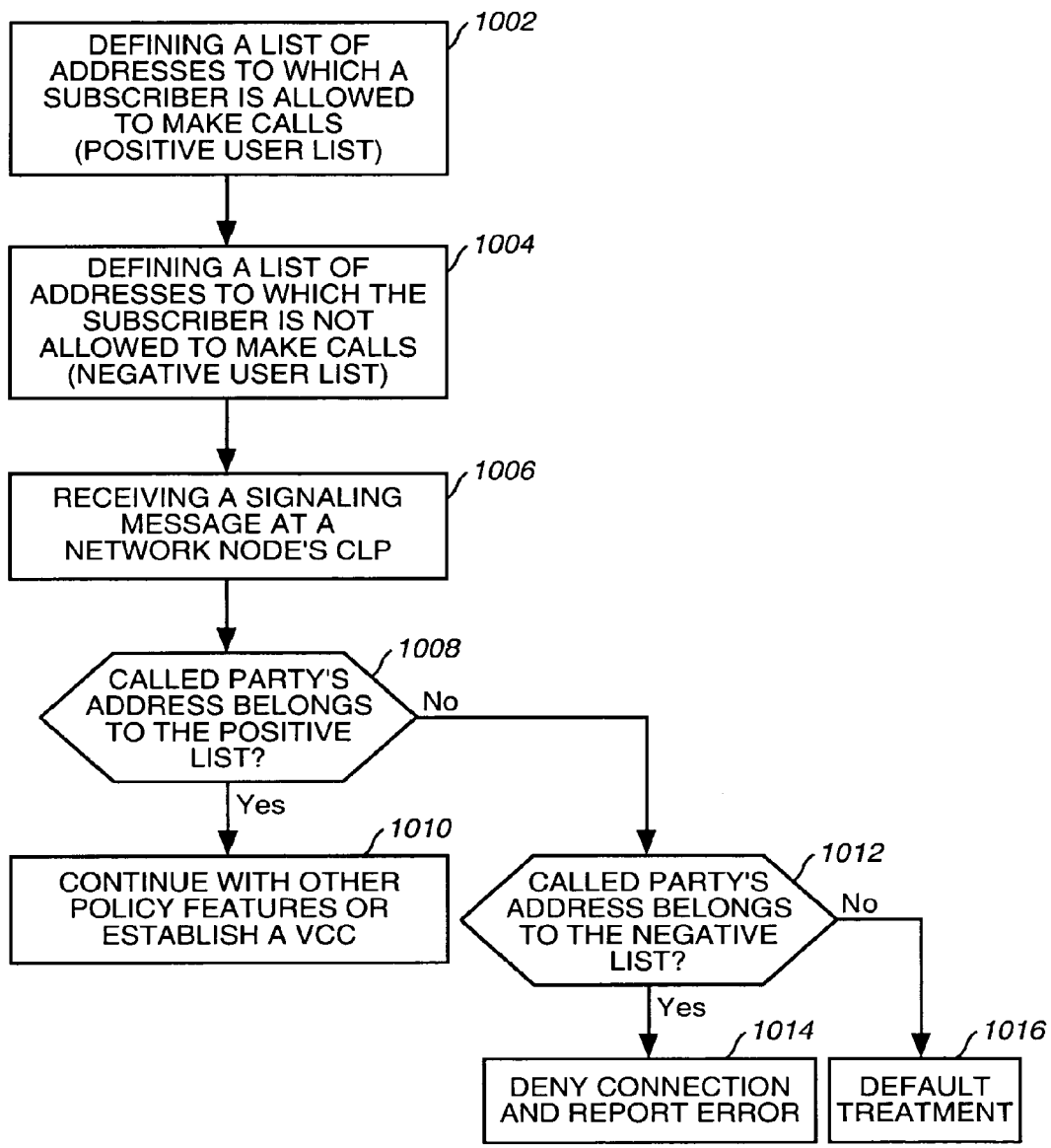
FIG. 10 is a flow chart of an exemplary method for effectuating a destination address screening feature in accordance with the teachings of the present invention.

FIG. 10 depicts a flow chart of the various steps involved in an exemplary implementation of the DAS feature, wherein the use of group lists is not explicitly illustrated. As set forth above, the process first involves defining a positive list and negative list of addresses for a subscriber (steps 1002 and 1004) which can include user-specific and group-specific lists. Upon invocation of the DAS feature (appropriately triggered by a signaling message received at the policy server via a CLP associated with the network) (step 1006), a determination is made in the policy server to verify that the called party address belongs to the positive list (decision block 1008). If so, the process continues which may include group-list verification as well (provided the user-list is first tested in the decision block 1008). Otherwise, a determination is made if the called party address belongs to the negative list (decision block 1012). If so, the user is denied establishing a connection through the network and an error report may ensue accordingly (step 1014).

Implementation-specific default treatments may be provided when a called party's address fails the positive list screening first and then fails the negative list screening as well, depending on whether group-specific lists are involved in the screening process (step 1016). For example, if the called party's address passes group-list screening first in the decision block 1008 and but then fails the user-list screening subsequently, call connection may be disallowed.

IV. Source Address Screening

The SAS feature is similar to the DAS feature described in the foregoing and is provisioned for an terminating party whereby a subscriber is allowed to define the addresses or address ranged from which calls can be received through the ATM network. Again, two types of screening are preferably provided for each subscriber: (i) a group list and (ii) a user list, and each list is provided with positive and negative types of screening. Also, the user list is checked before the group list.

Similar to the DAS feature, the SAS feature may be provisioned as follows in an exemplary embodiment of the present invention:

A user must be authorized for the SAS feature;

As part of authorization, the user is required to supply ranges of addresses to include the SAS lists (positive and negative);

Users may be allowed to share a SAS list;

If multiple users share a SAS list, then de-authorization of a SAS subscriber may not result in the removal of the SAS addresses; and De-authorization of the SAS feature may result in removal of the subscriber's SAS addresses when the de-authorized subscriber is the only user using the SAS list.

The policy server preferably supports the following data elements for effectuating the SAS feature in a presently preferred exemplary embodiment of the present invention:

Calling party number (mandatory at authorization, not modifiable thereafter or by user);

Called party number (mandatory at authorization, not modifiable thereafter or by user);

User group ID for identification of the user group profile (mandatory at authorization, not modifiable thereafter or by user);

SAS authorization status to indicate the authorization status for a particular user (mandatory at authorization; may be modifiable thereafter, but not by user);

SAS group list ID for identification of the group SAS list which is used for providing common address-screening to a group of users (mandatory at authorization if groups are involved; may be modifiable thereafter, but not by user);

SAS user list ID for identification of the user-specific SAS list which is used for providing a list addresses that is unique to a user (mandatory at authorization; may be modifiable thereafter, but not by user);

List ID for identification of a call-screening list (mandatory at authorization; may be modifiable thereafter, but not by user);

Entry type for identifying a call-screening set as a set of "allowed" addresses or as a list of "disallowed" addresses (mandatory at authorization; may be modifiable thereafter, but not by user);

Customer ID for identifying the customer (mandatory at authorization, not modifiable thereafter or by user); and Address range which includes the starting and ending points of an ATM address range (mandatory at authorization; may be modifiable thereafter, but not by user).

Figure 11:
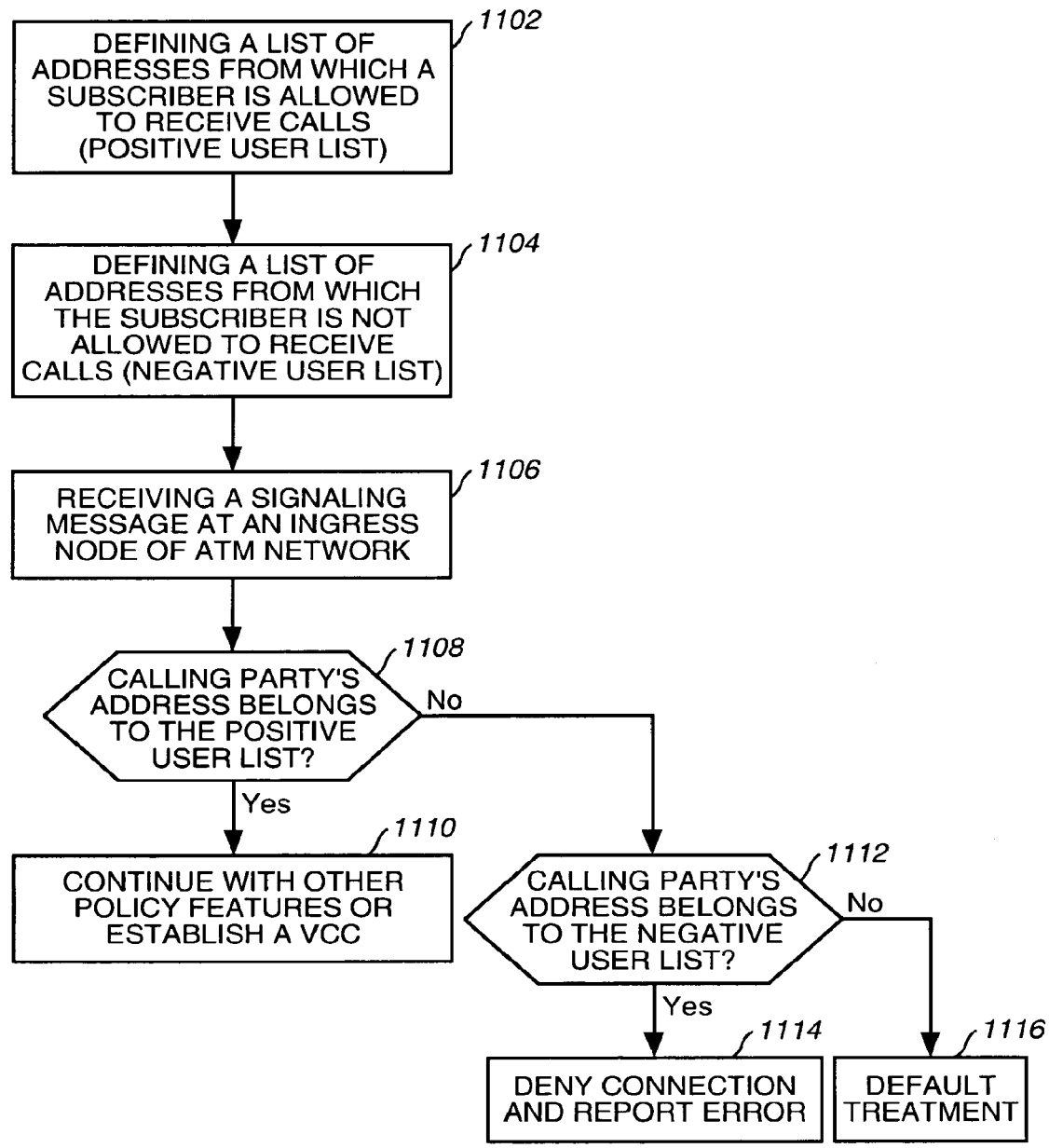
FIG. 11 is a flow chart of an exemplary method for effectuating a source address screening feature in accordance with the teachings of the present invention.

FIG. 11 depicts a flow chart of the various steps involved in an exemplary implementation of the SAS feature, wherein the use of group lists is not explicitly illustrated. Those skilled in the art should readily recognize that the SAS feature implementation is essentially similar to the implementation of the DAS feature set forth above.

The SAS feature implementation first involves defining a positive list and negative list of addresses for a subscriber (steps 1102 and 1104) which can include user-specific and group-specific lists. Upon invocation of the SAS feature (appropriately triggered by a signaling message received at the policy server via a CLP associated with the network) (step 1106), a determination is made in the policy server to verify that the calling party address belongs to the positive list (decision block 1108) associated with the called party. If so, the process continues (step 1110) which may include group-list verification as well (provided the user-list is first tested in the decision block 1108). Otherwise, a determination is made if the calling party address belongs to the negative list (decision block 1112). If so, the user (i.e., the calling party) is denied establishing a connection to the called party through the network and an error report may ensue accordingly (step 1114).

Once again, implementation-specific default treatments may be provided when a calling party's address fails the positive list screening first and then fails the negative list screening as well, depending on whether group-specific lists are involved in the screening process (step 1116). For example, if the calling party's address passes group-list screening first in the decision block 1108 and but then fails the user-list screening subsequently, call connection may be disallowed.

V. Customer Port Maximum Burst Size Limit

The CMBS feature provides a mechanism to limit the burst-size requests received for a connection on a CLP in the network. Preferably, burst-size limits are implemented on both forward and backward directions of the connection (the directionality being defined with respect to whether the data is going into the network from the port or vice versa).

Authorization of the CMBS feature is preferably provided on a per CLP basis, by defining appropriate entries in the CLP profile. In, a presently preferred exemplary embodiment of the present invention, authorization persists for the life of the CLP and the feature is de-authorized when the CLP is deleted from the network.

The policy server supports the following data elements for implementing the CMBS feature in accordance with the teachings of the present invention:

Maximum Burst-size Forward which defines the forward burst size limit (in cells) allowed for an individual call setup request; and Maximum Burst-size Backward which defines the backward burst size limit (in cells) allowed for an individual call setup request.

These data elements are mandatory at the time authorization. They may be modified thereafter by the system administrator. However, a user may not change them.

Figure 12:
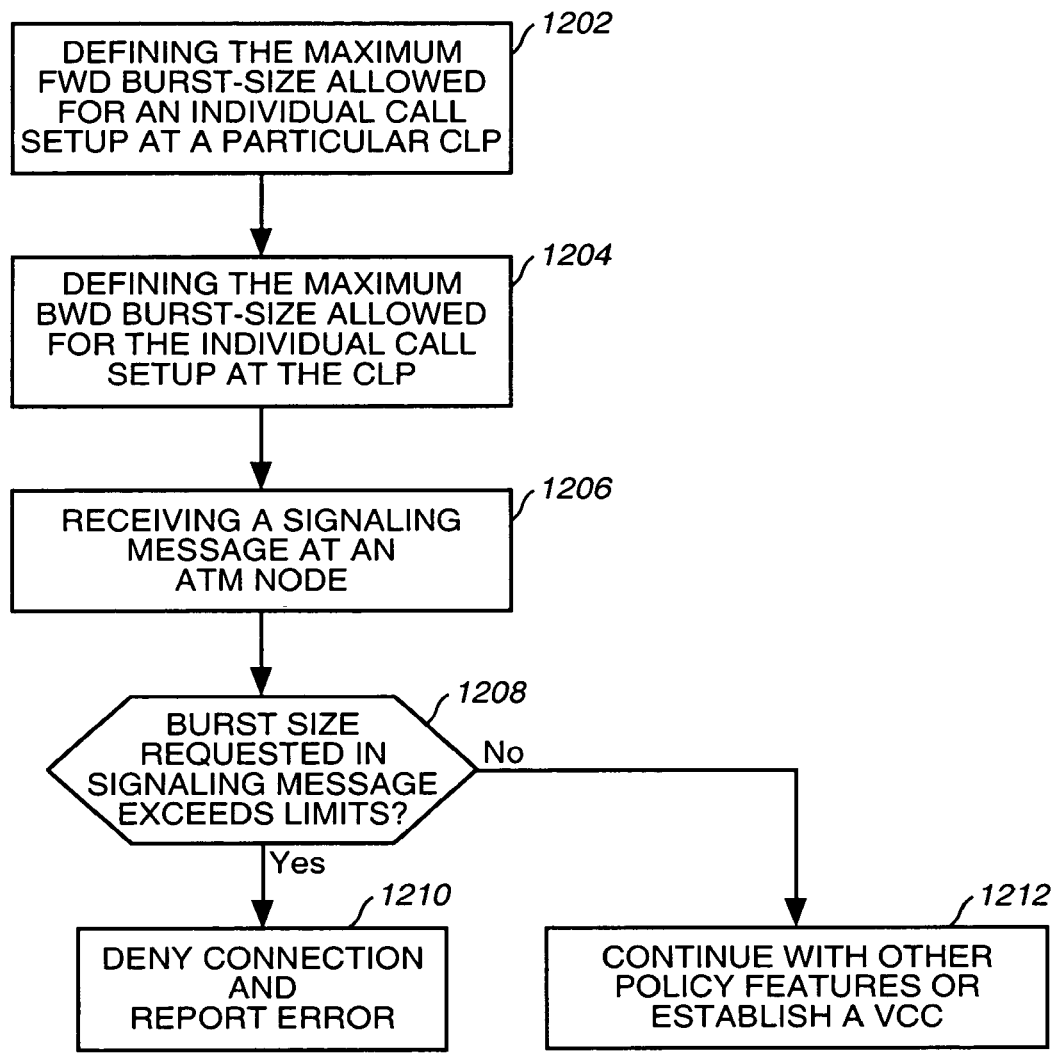
FIG. 12 is a flow chart of an exemplary method for effectuating a maximum burst-size request feature in accordance with the teachings of the present invention.

Referring to FIG. 12, depicted therein is a flow chart which includes the various steps involved in an exemplary implementation of the CMBS feature of the present invention. As set forth above, the forward and backward burst-size limits are defined on a per CLP basis for an individual call setup (steps 1202 and 1204). Upon invocation of the CMBS feature triggered from a signaling message (e.g., call setup request) received at an ATM node (step 1206), the policy server associated therewith determines if the requested connection pursuant to the signaling message results in exceeding maximum burst-size limits in either the forward or backward direction (decision block 1208). If so, call connection is denied and an error report follows (step 1210) which includes an indication as to which limit or limits would be exceeded if the connection due to the received message were set up.

If it is determined that the requested message does not result in a connection which exceeds the maximum burst-size limits in both directions, the service logic proceeds to continue with other policy features, if any, or with the establishment of the connection through the network (step 1212).

VI. Customer Port Service Class Selection

The CSCS feature provides a mechanism to configure the various service classes available for an individual CLP in an ATM network. When the feature is authorized, the policy server supports the ability to configure the following classes of service on a CLP basis:

Constant Bit-rate (CBR);
Variable Bit-rate, non-real-time (VBR-NRT);
Variable Bit-rate, real-time (VBR-RT);
Unspecified Bit-rate (UBR); and
Available Bit-rate (ABR).

It should be appreciated, however, that should the protocol offer other classes of service, they may be supported by the policy server as well.

The following data elements are supported in the policy server for implementing the CSCS feature:

CLP ID which identifies the CLP for which the CSCS feature is authorized; and

Service class status—a composite value that defines the classes of service available for the indicated CLP. In a presently preferred exemplary embodiment, the composite value takes integers ranged between 0 and 255 with the following encoding: UBR allowed (1); VBR-NRT allowed (2); VBR-RT allowed (4); ABR allowed (8); and CBR allowed (16). When a value of zero is specified, no class of service is allowed. A value of 255, on the other hand, indicates that all classes of services are allowed for the identified CLP.

The data elements set forth above are mandatory at the time of authorization. They may not be modified thereafter by the system or the user.

Figure 13:
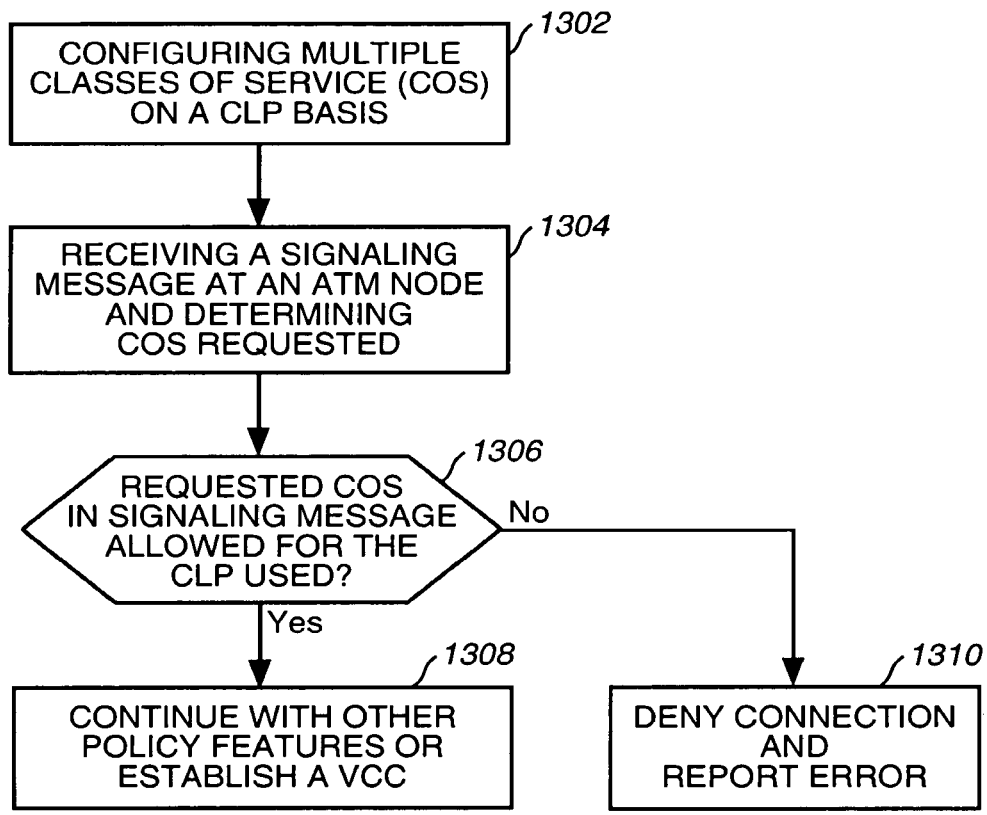
FIG. 13 is a flow chart of an exemplary method for effectuating a class-of-service provisioning feature in accordance with the teachings of the present invention.

Preferably, the CSCS feature is invoked during processing of a Setup message on either the ingress side or egress side of the network. FIG. 13 depicts a flow chart of the steps involved in an exemplary implementation of the CSCS feature of the present invention. As set forth above, multiple classes are configured in the network on a per CLP basis (step 1302) by specifying various service class status values in the CLP profiles. Upon receiving a signaling message (i.e., Setup) at an ATM node (egress or ingress), the policy server (i.e., the MSCP) associated therewith determines the requested class of service (COS) based on the parameters received in the signaling message (step 1304). Thereafter, a determination is made in the policy server whether the requested COS is allowed for the CLP through which the connection is to be established (decision block 1306). If the requested COS is allowed for the CLP, the CSCS feature passes and the handling of the signaling message continues (step 1308). Otherwise, call connection is denied, preferably with an error report indicating the reason(s) for the CSCS feature failure (step 1310).

VII. Customer Port Maximum Concurrent Calls in Progress Limit

The CMC feature provides a mechanism to limit the number of concurrent active calls being handled by the network through an individual CLP. Authorization for this feature is provided on a per CLP basis as part of the CLP profile.

The policy server is provided with the capability to support the following data elements to implement the CMC feature of the present invention:

CLP ID to identify the CLP for which the CMC service feature is provisioned;

Authorization status to indicate the authorization status of the feature for a particular user; and Maximum concurrent calls allowed for the CLP.

The processing of the CMC feature with respect to the various signaling messages on the ingress and egress sides of the network is set forth below:

1. Setup Request:

Upon invocation of the CMC feature resulting from a call setup request, the policy server determines if the requested call would result in the maximum number of concurrent calls being exceeded. If the call does not result in the maximum number of concurrent calls being exceeded, the CMC check passes and the handling of the Setup request continues. Otherwise, the CMC check fails.

2. Connect Request:

Upon invocation of the CMC feature resulting from a call connect request, the policy server determines if the requested call would result in the maximum number of concurrent calls being exceeded. If not, the CMC check passes. Upon successfully passing the check, a concurrent call counter associated with the CLP is incremented and the handling of the Connect request continues.

If the call results in the maximum number of concurrent calls being exceeded, the CMC check and the Connect request fail. An error report is preferably provided as part of the response message.

3. Release Request:

Upon invocation of the CMC feature resulting from a call release request, the policy server decrements the count of concurrent calls for the CLP indicated in the Release request.

Figure 14:
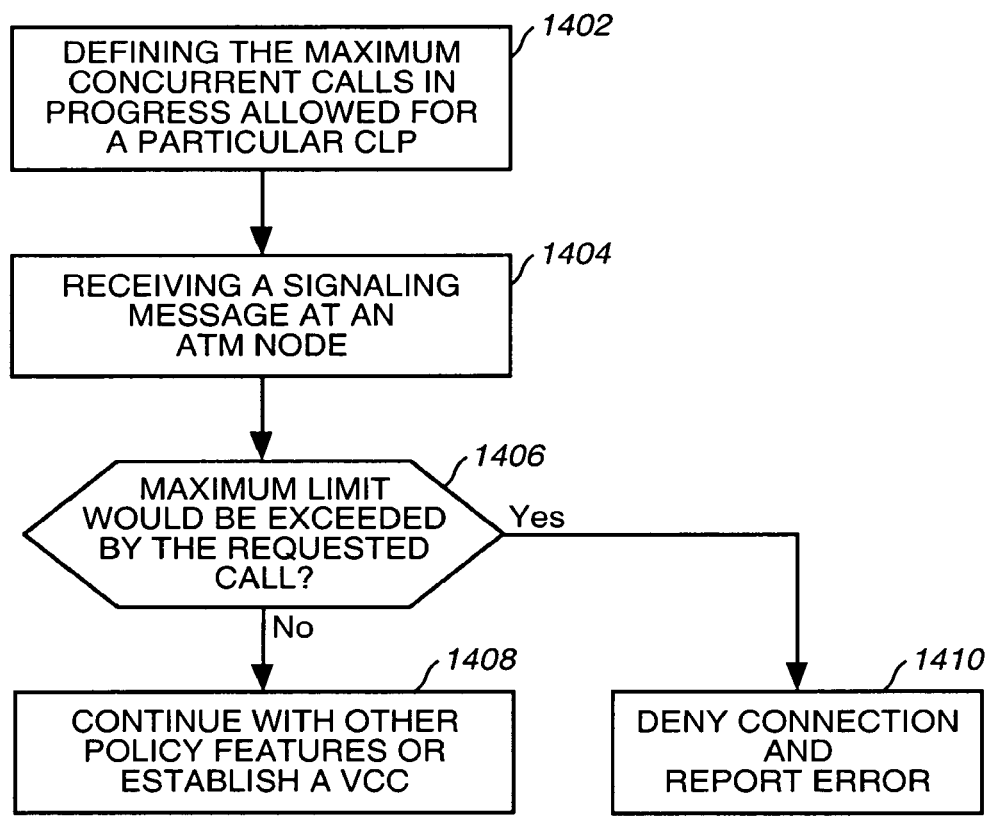
FIG. 14 is a flow chart of an exemplary method for effectuating a maximum concurrent calls in progress feature in accordance with the teachings of the present invention.

FIG. 14 depicts a flow chart which includes the various steps in an exemplary implementation of the CMC feature of the present invention. As set forth above, a maximum number of concurrent calls allowed for a CLP is defined on a per CLP basis (step 1402). When a signaling message is received in a network node (egress or ingress) (step 1404), the policy server makes the determinations as described above and a concurrent call counter is accordingly incremented or decremented based on the message (decision block 1406). If the CMC check passes, the service logic proceeds accordingly, with other policy features (if any) or establishing the connection (step 1408). Otherwise, the CMC check fails and the connection is denied (step 1410). Preferably, an error report indicating that a pre-defined maximum number of CMC validation failures for a given CLP is exceeded may be provided.

VIII. Customer Port Aggregate Bandwidth Limit

The CBW feature of the present invention provides a mechanism to limit the aggregate bandwidth handled by the network through an individual CLP. Authorization of the CBW feature is provided on a per CLP basis as part of CLP profiling. Preferably, the maximum burst size and overbooking factors for each COS (in the forward and backward directions) are provisioned for the CLPs for which the CBW feature is authorized. The overbooking factors are provided in order to account for statistical variations in the use of actual bandwidth capacity of a CLP, much like overbooking in air travel. In a presently preferred exemplary embodiment of the present invention, the overbooking factors are direction-specific as well as specific with respect to each COS provisioned for the particular CLP.

The following data elements are supported by the policy server in an exemplary implementation of the CBW feature of the present invention, which data elements are mandatory at the time of authorization:

CLP ID for identifying the CLP;
Authorization status to specify the authorization of the CBW feature for the indicated user;
Maximum Bandwidth Forward which defines the maximum aggregate bandwidth in the forward direction allowed for the CLP (in cells per second);
Maximum Bandwidth Backward which defines the maximum aggregate bandwidth in the backward direction allowed for the CLP (in cells per second); and
Forward and backward overbooking factors for CBR, VBT-RT and VBR-NRT service classes.

For each direction, two types of bandwidth rates may be provisioned: (i) a peak rate which is the maximum rate attainable on an "instantaneous" basis, and (ii) a sustained rate which is an average rate over a predetermined time duration. Further, various cell loss priorities may be specified for each service class. For example, when the cell loss priority bit is set, a switching node is allowed to discard cells without a "penalty" when a traffic congestion is encountered thereat.

Figure 15A:
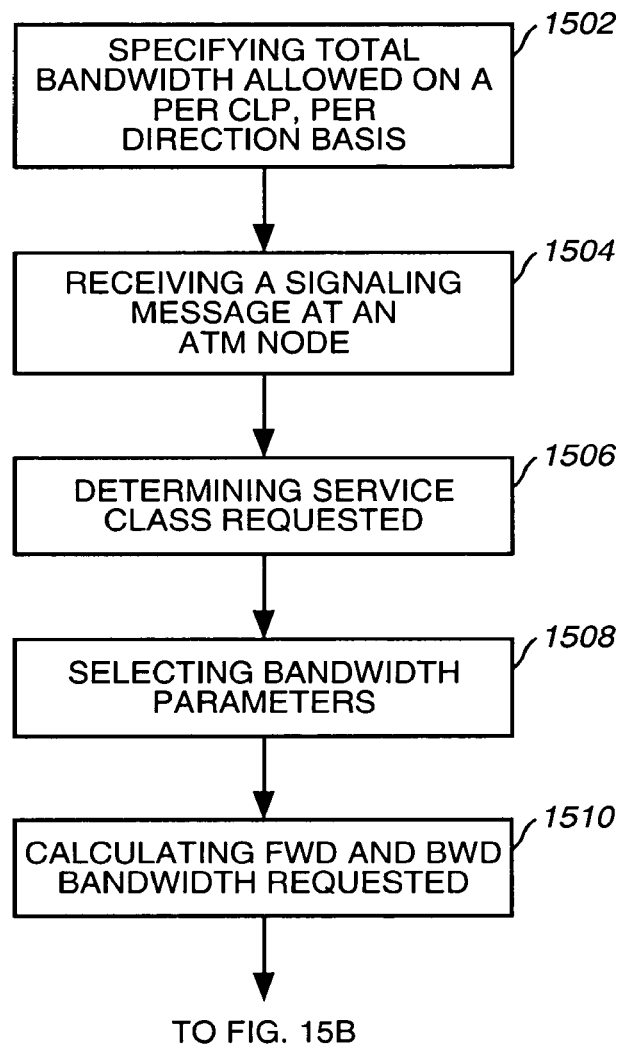
FIGS. 15A and 15B depict a flow chart of an exemplary method for effectuating an intelligent bandwidth control feature in accordance with the teachings of the present invention.
Figure 15B:
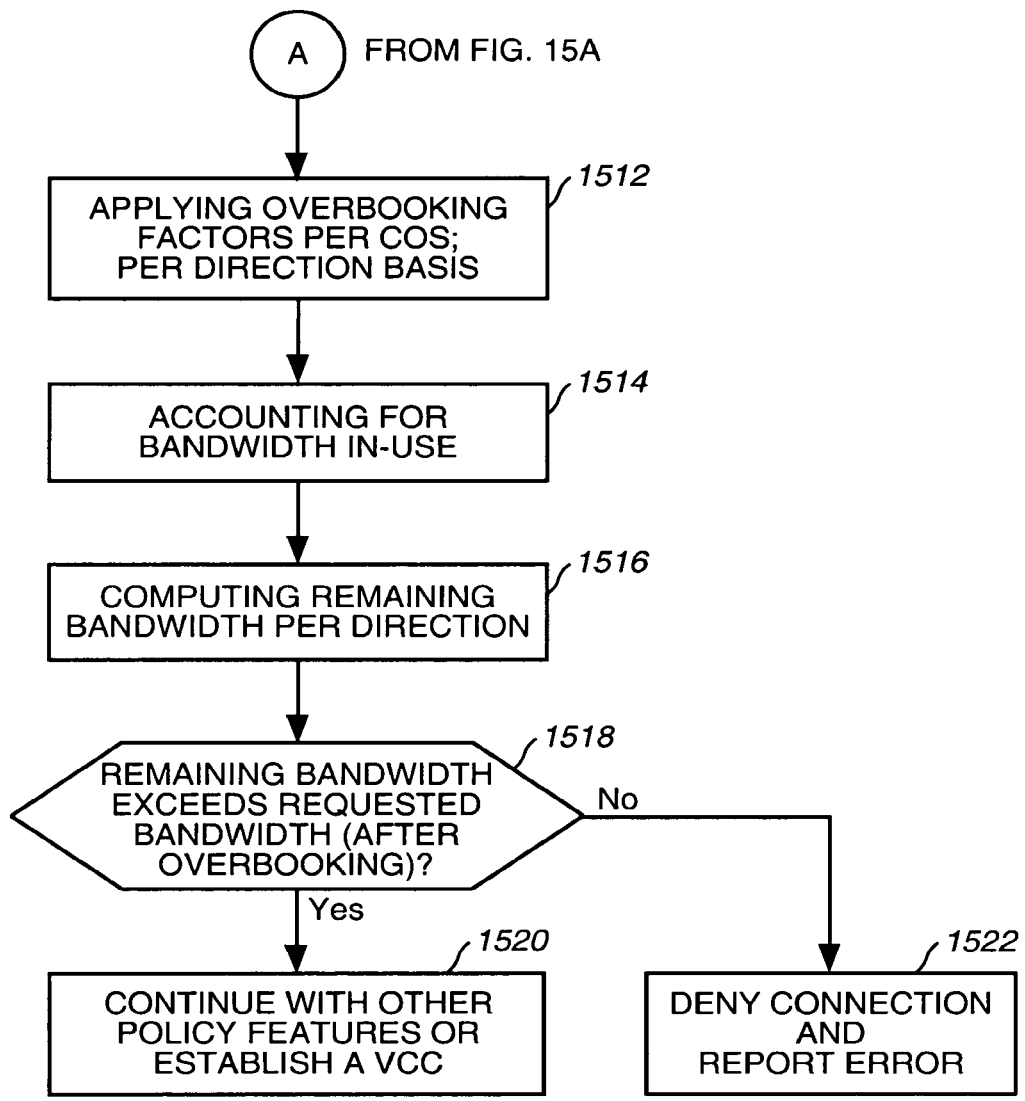

FIGS. 15A and 15B depict a flow chart of the various steps involved in an exemplary implementation of the CBW feature of the present invention. As set forth above, total or aggregate bandwidth is provisioned on a per CLP, per direction basis for the CLPs of the network (step 1502) as part of the CLP profile maintained by the policy server. When a signaling message is received at an ATM node (step 1504), the policy server determines the service class requested based on the message parameters such as, for example, bearer class, transfer capability, best effort indicator, et cetera (step 1506). Various bandwidth related parameters received in the signaling message are then selected (step 1508) for calculating raw bandwidth requirements in both forward and backward directions (step 1510).

Thereafter, COS- and direction-specific overbooking factors are applied to the raw bandwidth requirements so as to arrive at requested bandwidth in both directions (step 1512). After accounting for the bandwidth in use (step 1514), the remaining bandwidth per direction is computed (step 1516). The policy server then determines, on a per direction basis, if the remaining bandwidth exceeds the requested bandwidth (i.e., after overbooking) (decision block 1518). If the requested bandwidth can be accommodated on both directions, the service logic continues as described elsewhere (step 1520). Otherwise, the CBW feature fails and the connection is denied accordingly. An error report may preferably be issued as part of a response message from the policy server (step 1522).

As a simple example of the intelligent bandwidth provisioning scheme of the present invention, assume that an aggregate bandwidth of 100 cells/second is provisioned for each direction for a CLP. Of this aggregate bandwidth, a rate of 97 cells/second is in use in the forward direction. When a Setup message is received with a forward bandwidth requirement of 20 cells/second and an overbooking factor of 5, the requested forward bandwidth is computed to be 4 cells/second, which is greater than the remaining bandwidth provisioned for the CLP. Accordingly, the call connection is denied in this example.

Based on the foregoing Detailed Description, it should be readily apparent that the present invention provides an intelligent policy server solution wherein the signaling messages are analyzed before the virtual connections are established in the ATM network for advantageously effectuating various service policies or features. Because the intelligent decision-making is provided at the edge of the network (i.e., ingress and egress sides), the network core is not impacted in the execution/enforcement of the various features, which may be provided in a scalable or staged manner.

Further, it is believed that the operation and construction of the various aspects of the present invention will be apparent from the foregoing description. While the method and system shown and described have been characterized as being preferred, it will be readily apparent that various changes and modifications could be made therein without departing from the scope of the present invention as set forth in the following claims.

What is claimed is:

1. A system comprising:
a memory device; and
a processor device to:
store, in the memory, information regarding a plurality of subscribers that are associated with a packet-switched network,
the information regarding the plurality of subscribers including:
a network address associated with a particular subscriber of the plurality of subscribers,
information identifying a Customer Logical Port (CLP) associated with the particular subscriber, information identifying a forward overbooking factor associated with the CLP, and
information identifying a reverse overbooking factor associated with the CLP, and
handle a communication associated with the particular subscriber based on at least one of the forward overbooking factor or the reverse overbooking factor.

2. The system of claim 1,
where the information regarding the plurality of subscribers further includes information regarding a particular feature for the particular subscriber,
where the particular feature for the subscriber includes one or more of:
a source address validation feature associated with the particular subscriber,
a maximum call attempt rate limit feature associated with the particular subscriber,
a destination address screening feature associated with the particular subscriber,
a source address screening feature associated with the particular subscriber,
a maximum burst size limit feature associated with the particular subscriber,
an aggregate bandwidth limit feature associated with the particular subscriber,
a service class selection feature associated with the particular subscriber, or
a maximum concurrent call limit feature associated with the particular subscriber, and
where handling the communication is further based on the particular feature.

3. The system of claim 1, where the processor device, when handling the communication associated with the particular subscriber, is further to:
establish one or more connections, via the packet-switched network, based on at least one of the forward overbooking factor or the reverse overbooking factor.

4. The system of claim 1, where the processor device is further to:
receive a signaling message related to the communication associated with the particular subscriber, and
evaluate at least one of the forward overbooking factor or the reverse overbooking factor based on receiving the signaling message.

5. The system of claim 4, where the signaling message includes at least one of:
a Connect message,
an Add Party message,
a Release message, or
a Setup message.

6. The system of claim 1, where the processor device, when handling the communication associated with the particular subscriber, is further to:
determine whether the network address associated with the particular subscriber is within a particular range of network addresses, and
handle the communication associated with the particular subscriber further based on whether the network address associated with the particular subscriber is within the particular range of network addresses.

7. The system of claim 1, where the processor device, when handling the communication associated with the particular subscriber, is further to:
identify a requested class of service for the communication associated with the particular subscriber,
determine whether the requested class of service is permitted for the CLP associated with the particular subscriber, and
handle the communication associated with the particular subscriber further based on whether the requested class of service is permitted for the CLP associated with the particular subscriber.

8. A non-transitory computer-readable medium to store instructions, the instructions comprising:
one or more instructions that, when executed by a processor of a computing device, cause the processor to:
determine information associated with a subscriber of a packet-switched network,
the information identifying:
a network address associated with the subscriber,
a Customer Logical Port (CLP) associated with the subscriber,
information identifying a forward overbooking factor associated with the CLP, and
information identifying a reverse overbooking factor associated with the CLP,
receive a request to establish a communication associated with the subscriber, and
establish, based on receiving the request, one or more connections for the communication,
the one or more connections being established in the packet-switched network based on at least one of the forward overbooking factor or the reverse overbooking factor.

9. The computer-readable medium of claim 8,
where the information associated with the subscriber further includes information regarding a particular feature for the subscriber, and
where the particular feature includes one or more of:
a source address validation feature associated with the subscriber,
a maximum call attempt rate limit feature associated with the subscriber,
a destination address screening feature associated with the subscriber,
a source address screening feature associated with the subscriber,
a maximum burst size limit feature associated with the subscriber,
an aggregate bandwidth limit feature associated with the subscriber,
a service class selection feature associated with the subscriber, or
a maximum concurrent call limit feature associated with the subscriber.

10. The computer-readable medium of claim 8, where the request includes a signaling message related to the communication.

11. The computer-readable medium of claim 10, where the signaling message includes at least one of:
a Connect message,
an Add Party message,
a Release message, or
a Setup message.

12. The computer-readable medium of claim 8, where the instructions further include:
one or more instructions that, when executed by the processor, cause the processor to:
evaluate a particular policy feature with respect to the communication, the one or more connections being established further based on determining that the communication complies with the particular policy feature.

13. The computer-readable medium of claim 12, where the one or more instructions to evaluate the particular policy feature with respect to the communication include:
one or more instructions that, when executed by the processor, cause the processor to:
determine whether the network address associated with the subscriber is within a particular range of network addresses,
the one or more connections being established further based on determining that the network address associated with the subscriber is within the particular range of network addresses.

14. The computer-readable medium of claim 12, where the one or more instructions to evaluate the at least one policy feature with respect to the communication include:
one or more instructions that, when executed by the processor, cause the processor to:
identify a requested class of service for the communication, and
determine whether the requested class of service is permitted for the CLP,
the one or more connections being established further based on the requested class of service being permitted for the CLP.

15. A method comprising:
determining, by a processor, information regarding a subscriber associated with a packet-switched network, the information identifying:
a network address associated with the subscriber,
a Customer Logical Port (CLP) associated with the subscriber,
information identifying a forward overbooking factor associated with the CLP, and
information identifying a reverse overbooking factor associated with the CLP,
receiving, by the processor, a request to establish a communication associated with the subscriber; and
establishing, by the processor, one or more connections for the communication in the packet-switched network based on at least one of the forward overbooking factor or the reverse overbooking factor.

16. The method of claim 15,
where the information regarding the subscriber further includes information regarding a particular feature for the subscriber, and
where the particular feature includes one or more of:
a source address validation feature associated with the subscriber,
a maximum call attempt rate limit feature associated with the subscriber,
a destination address screening feature associated with the subscriber,
a source address screening feature associated with the subscriber,
a maximum burst size limit feature associated with the subscriber,
an aggregate bandwidth limit feature associated with the subscriber,
a service class selection feature associated with the subscriber, or
a maximum concurrent call limit feature associated with the subscriber.

17. The method of claim 15, where the request includes at least one of:
a Connect message,
an Add Party message,
a Release message, or
a Setup message.

18. The method of claim 15, further comprising:
evaluating a particular policy feature with respect to the request,
the one or more connections being established further based on evaluating the particular policy feature with respect to the request.

19. The method of claim 18, where evaluating the particular policy feature with respect to the request includes:
determining whether the network address associated with the subscriber is within a particular range of network addresses,
the one or more connections being established further based on determining that the network address associated with the subscriber is within the particular range of network addresses.

20. The method of claim 15, where establishing the one or more connections includes:
determining a class of service that is permitted for the CLP; and
establishing the one or more connections further based on the class of service.

* * * * *